US012782696B2

(12) United States Patent
Emura et al.

(10) Patent No.: US 12,782,696 B2
(45) Date of Patent: Nov. 3, 2026

(54) OPTICAL SYSTEM, IMAGING DEVICE, AND MOVING BODY

(71) Applicant: Tamron Co., Ltd., Saitama (JP)

(72) Inventors: Hiroki Emura, Saitama (JP); Yoshito Iwasawa, Saitama (JP)

(73) Assignee: TAMRON CO., LTD., Saitama (JP)

( * ) Notice: Subject to any disclaimer, the term of this patent is extended or adjusted under 35 U.S.C. 154(b) by 0 days.

(21) Appl. No.: 19/256,167

(22) Filed: Jul. 1, 2025

(65) Prior Publication Data

US 2026/0029628 A1 Jan. 29, 2026

(30) Foreign Application Priority Data

Jul. 23, 2024 (JP) ................................ 2024-117382

(51) Int. Cl.

*G02B 15/14* (2006.01)
*G02B 13/00* (2006.01)
*H04N 23/55* (2023.01)

(52) U.S. Cl.

CPC ..... *G02B 15/1421* (2019.08); *G02B 13/0045* (2013.01); *G02B 13/009* (2013.01); *H04N 23/55* (2023.01)

(58) Field of Classification Search

CPC .............. G02B 13/0045; G02B 13/009; G02B 15/1421; G02B 13/02; G02B 13/04; G02B 9/60; H04N 23/55; G06F 11/0793; G06F 11/1004; G06F 11/1012; G06F 11/1016; G06F 11/1048; G06F 11/1068; G06F 17/16; G11C 29/42; H03M 13/616

See application file for complete search history.

(56) References Cited

U.S. PATENT DOCUMENTS 10,782,511 B2 * 9/2020 Igarashi ........... A61B 1/000095
2014/0063626 A1 * 3/2014 Huang ................... G02B 13/04 359/752
2015/0226943 A1 * 8/2015 Ogata .................... G02B 15/12 359/675
2015/0370041 A1 * 12/2015 Noda ..................... G02B 15/14 359/683
2019/0064501 A1 * 2/2019 Katakura ........... A61B 1/00096
2020/0064600 A1 * 2/2020 Igarashi ........... A61B 1/000095
2021/0181462 A1 * 6/2021 Hatada ............... G02B 27/0025
2026/0029627 A1 * 1/2026 Emura ..................... G02B 9/64

FOREIGN PATENT DOCUMENTS

JP 2021-189351 A 12/2021

* cited by examiner

*Primary Examiner* — Antoinette T Spinks
(74) *Attorney, Agent, or Firm* — Paratus Law Group, PLLC

(57) ABSTRACT

In order to solve the above problem, an optical system according to the present invention includes a front group, a diaphragm, and a rear group in order from an object side, in which the optical system includes a lens A having positive refractive power and being closest to the object side in the front group and a lens B having negative refractive power and being closest to an image side in the rear group, an object-side surface of the lens B has a concave surface with respect to the object side, a number of lenses having refractive power and included in the front group and the rear group is eight or less in total, and the optical system satisfies a predetermined condition.

22 Claims, 10 Drawing Sheets

OPTICAL SYSTEM, IMAGING DEVICE, AND MOVING BODY

CROSS-REFERENCE TO RELATED APPLICATIONS

This application is based on and claims the benefit of priority from Japanese Patent Application No. 2024-117382, filed on Jul. 23, 2024, the entire contents of which are incorporated herein by reference.

BACKGROUND OF THE INVENTION

Technical Field

The present invention relates to an optical system, an interchangeable lens device and an imaging device having the optical system, and a moving body having the optical system. Specifically, for example, the present invention relates to a small optical system suitable for a photographing device that obtains external information in a photographing optical system of a digital input/output device such as a digital still camera or a digital video camera using a solid-state image sensor or the like, and a moving body such as a vehicle or a drone, a lens device and an imaging device having the optical system, a moving body having the optical system and the imaging device.

Related Art

Conventionally, a photographing device using a solid-state image sensor such as a digital still camera or a digital video camera has been widely used. With the increase in the number of pixels of solid-state image sensors used in these imaging devices, high resolution performance has been required for optical systems while maintaining small size and light weight. Furthermore, there is a strong demand for larger apertures and lower costs as well as downsizing of the optical system, and such a demand for the optical system has been growing.

In order to meet these demands, for example, a small optical system including a first lens group having positive refractive power, a second lens group having positive refractive power, and a third lens group having negative refractive power and suppressing various aberrations has been proposed (see JP 2021-189351 A).

SUMMARY OF THE INVENTION

For downsizing the optical system, it is effective to adopt a telephoto-type power arrangement having positive refractive power on the object side and negative refractive power on the image side. However, in a case where the power arrangement is strengthened, it is difficult to satisfactorily correct various aberrations with a small number of lenses. Therefore, in order to achieve both downsizing and high performance of the optical system, it is needed to optimize the refractive power and the lens configuration of each lens.

An object of the present invention is to provide a compact and high-performance optical system, an imaging device, and a moving body including the same.

In order to solve the above problem, an optical system according to the present invention includes a front group, a diaphragm, and a rear group in order from an object side, in which the optical system includes a lens A having positive refractive power and being closest to the object side in the front group and a lens B having negative refractive power and being closest to an image side in the rear group, an object-side surface of the lens B has a concave surface with respect to the object side, a number of lenses having refractive power and included in the front group and the rear group is eight or less in total, and the optical system satisfies following conditional expressions:

$$1.59 < NdLB < 2.30 \quad (1)$$

$$1.60 < TLSB/BF < 10.00 \quad (2)$$

$$0.20 < fR/f < 1.05 \quad (3)$$

where

NdLB is a refractive index at a d-line of the lens B,

TLSB is a distance from the diaphragm to an image-side surface of the lens B,

BF is an air conversion distance from a lens surface closest to the image side in the rear group to the image plane, fR is a focal length of the rear group, and f is a focal length of the optical system.

In order to solve the above problem, an optical system according to the present invention includes a front group, a diaphragm, and a rear group in order from an object side, in which the optical system includes a lens A having positive refractive power and being closest to the object side in the front group and a lens B having negative refractive power and being closest to an image side in the rear group, an object-side surface of the lens B has a concave surface with respect to the object side, a number of lenses having refractive power included in the rear group is five or less in total, and the optical system satisfies following conditional expressions:

$$0.20 < fR/f < 0.92 \quad (3\text{-}1)$$

$$-1.85 < FLB/f < -0.45 \quad (4)$$

$$25.00 < vdLA < 110.00 \quad (5)$$

$$18.00 < vdLB < 52.00 \quad (6)$$

$$-1.18 < CRBf/f < -0.20 \quad (7)$$

where fR is a focal length of the rear group, and f is a focal length of the optical system.

FLB is a focal length of the lens B, vdLA is an Abbe number at a d-line of the lens A, vdLB is an Abbe number at a d-line of the lens B, and CRBf is a radius of curvature of the object-side surface of the lens B.

In order to solve the above problem, an imaging device according to the present invention includes the optical system described above and an image sensor that receives an optical image formed by the optical system and converts the optical image into an electrical image signal.

In order to solve the above problem, a moving body according to the present invention includes an imaging device including the above-described optical system and an image sensor that receives an optical image formed by the optical system and converts the optical image into an electrical image signal.

According to the present invention, a small and high-performance optical system, an imaging device, and a moving body can be provided.

DESCRIPTION OF THE EMBODIMENTS

Figure 1:
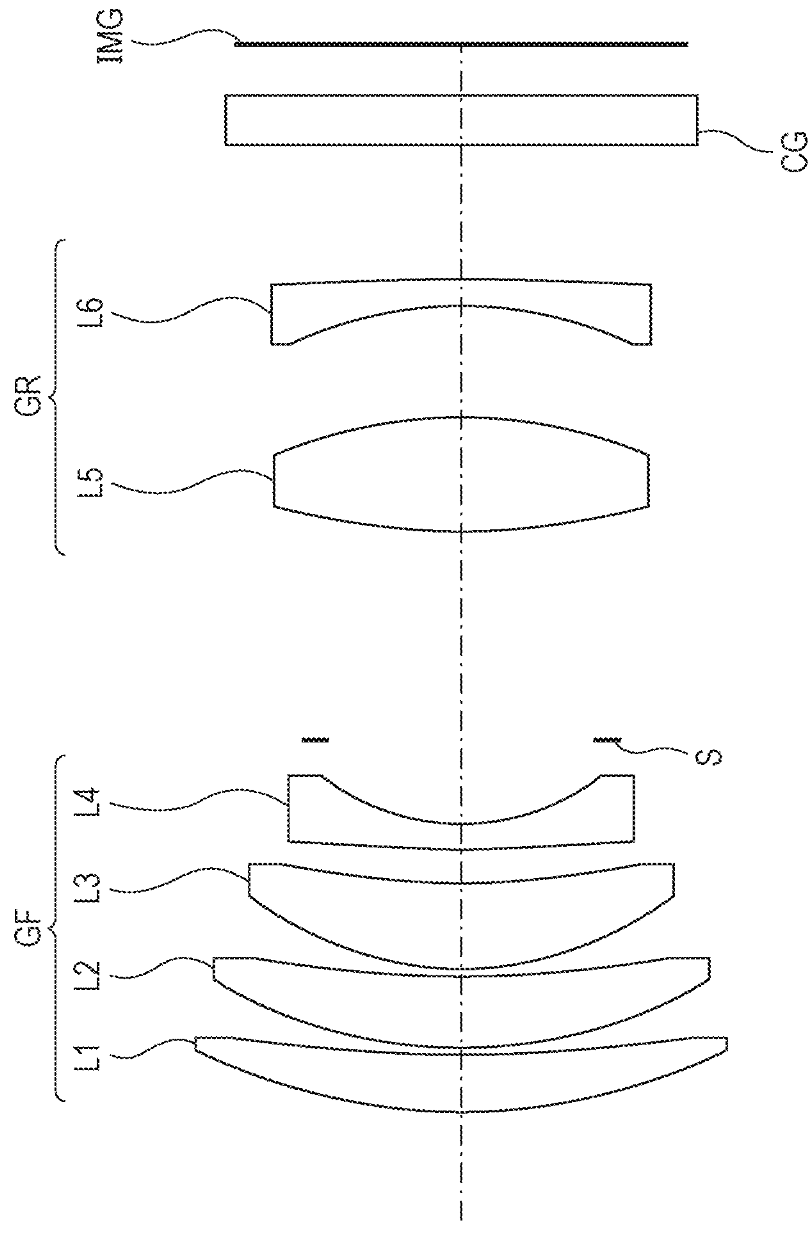
FIG. 1 is a cross-sectional view of an optical system according to Example 1 of the present invention.
Figure 2:
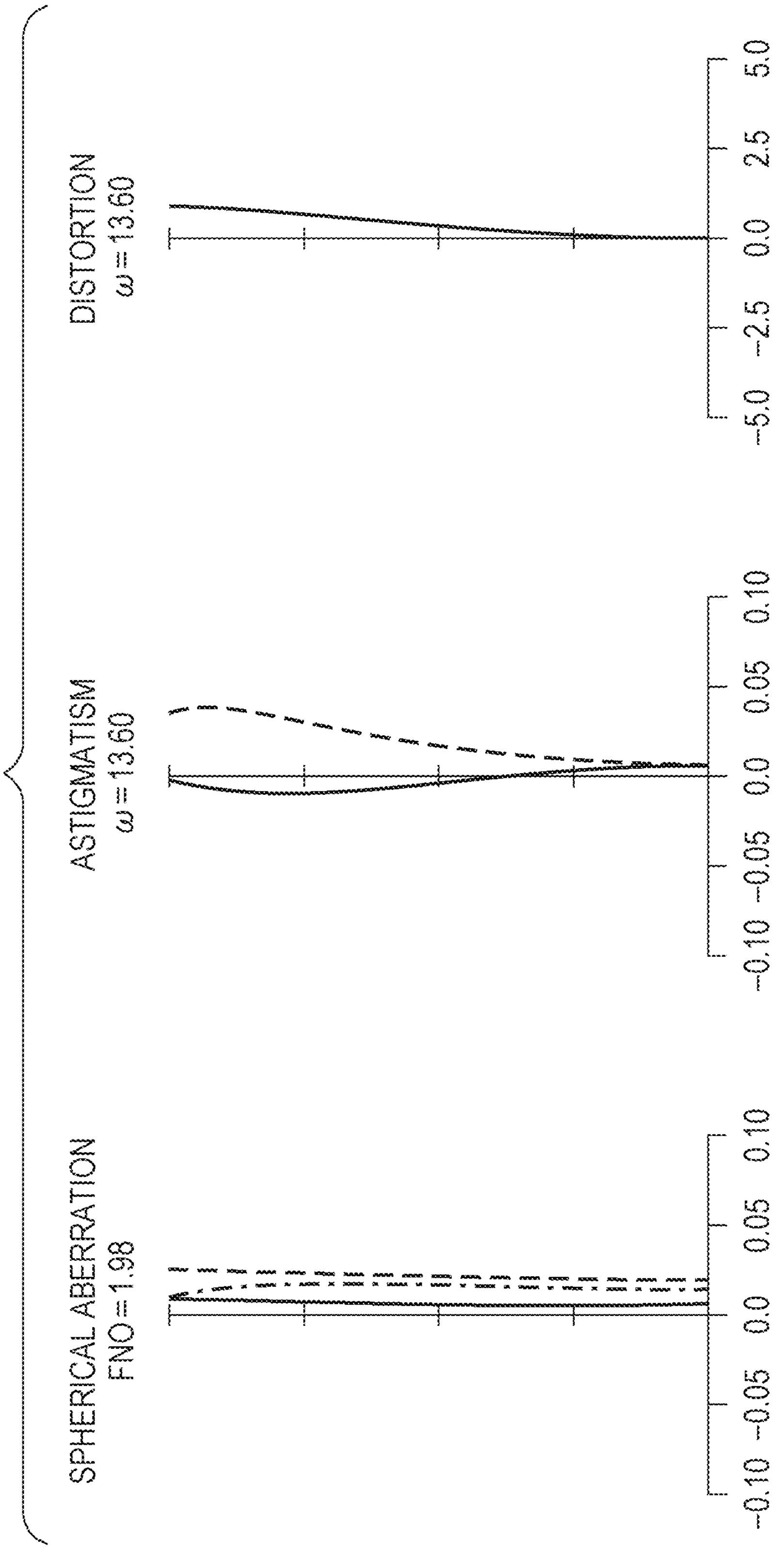
FIG. 2 is a spherical aberration diagram, an astigmatism diagram, and a distortion diagram of the optical system according to Example 1 of the present invention.

Hereinafter, an embodiment of an optical system, an imaging device, and a moving body according to the present invention will be described.

1. Optical System 1-1. Optical Configuration of Optical System

First, an optical configuration of an optical system according to the present invention will be described. The optical system according to the present embodiment includes a front group, a diaphragm, and a rear group in order from an object side.

The optical system includes lens groups each including at least one lens on the object side and an image side of the diaphragm. By arranging the lens groups on the object side and the image side of the diaphragm, aberration is easily canceled each other before and after the diaphragm, and off-axis coma aberration is easily corrected. However, the diaphragm here refers to an aperture diaphragm that defines the light flux diameter of the optical system, that is, an aperture diaphragm that defines F-number of the optical system.

The optical system includes lens groups each including at least one lens on the object side and an image side of the diaphragm. By arranging the lens groups on the object side and the image side of the diaphragm, aberration is easily canceled each other before and after the diaphragm, and the number of lenses is effectively reduced. Accordingly, cost reduction is achieved, volume of the lens is reduced, and weight reduction of the lens is achieved. It is preferable that the number of lenses having refractive power included in the front group and the rear group is nine or less in total from the viewpoint of cost reduction and weight reduction. It is more preferable that the number of lenses is eight or less in total, and still more preferably seven or less.

In a case where a lens having positive refractive power and a lens having negative refractive power included in the optical system are cemented, the cemented lens may be broken when the temperature changes significantly. This is because in a case where there is a difference between the linear expansion coefficient of the lens having negative refractive power and the linear expansion coefficient of the lens having positive refractive power, a difference occurs in the shape change due to the temperature change, and as the diameter increases, the shape change increases, so that the cemented lens breaks. Therefore, in a case where the ratio of the change in the sample length at the unit temperature is the average linear expansion coefficient $\alpha$, it is preferable to reduce the difference between the average linear expansion coefficient $\alpha 1n$ of the lens having negative refractive power and the average linear expansion coefficient alp of the lens having positive refractive power. Furthermore, it is preferable that $|\alpha 1p-\alpha 1n|<50\times 10-7/^{\circ}$ C. in order to prevent cracking of a cemented lens having a large diameter.

Hereinafter, the optical configuration of the optical system will be described in more detail.

(1) Front Group

The front group is a lens group arranged on the object side with respect to the diaphragm in the lens group constituting the optical system. Here, an optical element having no refractive power or having extremely small refractive power may be disposed on the object side of the lens closest to the object side in the front group. Examples of such the optical element include various filters such as a prism that reflects and bends the optical axis of the optical system, a protective filter for protecting the lens from dirt, scratches, and the like, an ND filter used to reduce the amount of incident light, and a PL filter for adjusting color.

The front group has a lens A having positive refractive power on the most object side. It is advantageous to achieve a larger aperture by having a convergence action on the most object side. Even in a case where an even larger aperture is provided, an increase in the lens diameter can be prevented. Thereby, the volume of the lens is reduced, and the weight reduction of the optical system is achieved.

A specific lens configuration of the front group is not particularly limited as long as the front group has the lens A having positive refractive power on the most object side. Therefore, the front group may have at least one lens having positive refractive power. If the front group is configured using a plurality of lenses having positive refractive power, chromatic aberration and spherical aberration can be easily corrected, which is preferable.

A specific lens configuration of the front group is not particularly limited as long as the front group has the lens A having positive refractive power on the most object side. Since the convergence action is exerted on the most object side of the front group, the front group has a telephoto configuration by using a surface having negative refractive power on the most image-side surface of the front group or a lens having negative refractive power on the most image side of the front group. With such a configuration, downsizing is facilitated even in a case where the focal length is increased, and downsizing of the diaphragm diameter is achieved even in a case where a larger aperture is provided, which is effective for downsizing the optical system.

A specific lens configuration of the front group is not particularly limited as long as the front group has the lens A having positive refractive power on the most object side. In order to realize high optical performance while reducing the size and weight of the optical system and reducing the cost, it is preferable that the number of lenses having positive refractive power in the front group is four or less, and more preferably three or less.

(2) Rear Group

The rear group is a lens group arranged on the image side of the diaphragm. However, an optical element having no refractive power or having extremely small refractive power may be disposed on the image side of the lens in the rear group closest to the object image side. Examples of such an optical element include a prism that reflects and bends an optical axis of an optical system, a cover glass for protecting the image sensor from dirt, scratches, and the like, a band-pass filter used for cutting off a specific wavelength, a low-pass filter that attenuates a specific frequency for reducing moire, and the like.

The rear group has a lens B having negative refractive power on the most image side. By having the divergence action on the most image side, a telephoto configuration is obtained, which is advantageous for downsizing in the entire length direction and downsizing of the diameter of the image-side lens.

The rear group has the lens B having negative refractive power on the most image side. The object-side surface of the lens B has a concave surface with respect to the object side. With this configuration, off-axis coma aberration correction is improved, and high performance is achieved.

It is preferable that the surface closest to the object side in the rear group has a convex shape toward the object side. By having the surface of convergence action closest to the object side of the rear group, the rear group has a telephoto configuration having convergence action closest to the object side and divergence action closest to the image side, and downsizing in the entire length direction is achieved. In addition, spherical aberration correction is also effective, and high performance is achieved.

A specific lens configuration of the rear group is not particularly limited as long as the rear group has the lens B having negative refractive power on the most image side. Here, it is preferable that an air lens formed by the image-side surface of the lens adjacent to the object side of the lens B and the object-side surface of the lens B has a convex shape. By having the convex air lens, that is, a divergence action on the object side of the lens B, it is advantageous for downsizing of the lens B in the radial direction, and downsizing and weight reduction are achieved.

A specific lens configuration of the rear group is not particularly limited as long as the rear group has the lens B having negative refractive power on the most image side. In order to realize high optical performance while reducing the size and weight of the optical system and reducing the cost, it is preferable that the number of lenses having refractive power in the rear group is six or less, and more preferably five or less.

Since the rear group includes the lens B having the negative refractive power closest to the image side, at least one lens having the negative refractive power is included in the rear group. It is preferable that the refractive index of the lens having negative refractive power included in the rear group is high. This makes it easy to correct Petzval field curvature, is preferable in terms that field curvature is corrected and high performance is achieved. Since the optical system has a positive refractive power overall, it is preferable for the Petzval correction that the refractive index of the lens having a negative refractive power in the rear group is high. It is further preferable that the refractive index of the lens having negative refractive power in the rear group is $1.74<Ndn$, and the lower limit is further preferably 1.75, 1.76, 1.77, 1.78, 1.79, 1.80, 1.81, 1.82, 1.83, 1.84, 1.85, 1.86, 1.87, and 1.88 in this order.

(3) Focus Group

In the optical system, the presence or absence of a focus group is not particularly limited. In a case where the focus group is provided, at least one lens among the lenses constituting the optical system is set as the focus group, and the focus group can be moved in the optical axis direction to focus on a subject at the time of focusing. The position and refractive power of the lens used as the focus group in the optical system are not particularly limited.

In a case where the focus group is provided in the optical system, the number of lenses constituting the focus group is not particularly limited, and the number of lenses constituting the focus group may be one or more. However, it is preferable that the focus group includes a plurality of lenses in order to suppress aberration variation that occurs when focusing on a close subject.

In addition, in order to reduce the size and weight of the focus group, it is preferable that the focus group includes one single lens unit. Here, the single lens unit refers to a lens unit such as one single lens or a cemented lens in which a plurality of single lenses are integrated without an air interval. In other words, even in a case where the single lens unit has a plurality of optical surfaces, only the most object-side surface and the most image-side surface are in contact with air, and the other surfaces are not in contact with air. In this specification, the single lens may be either a spherical lens or an aspherical lens. In addition, the aspherical lens includes a so-called composite aspherical lens in which an aspherical film is attached to the surface. In particular, from the viewpoint of reducing the size and weight of the focus group while suppressing the aberration variation that occurs when the above close subject is focused, it is more preferable that the focus group includes a cemented lens in which a plurality of single lenses is integrated without interposing an air interval.

In a case where the focus group includes the above single lens unit, the focus group does not include an air interval. Therefore, compared with a case where the focus group has a plurality of single lenses arranged with an air interval, the size and weight of the focus group can be reduced. As a result, the size and weight of the mechanical parts (hereinafter, referred to as a "focus driving mechanism") for moving the focus group in the optical axis direction at the time of focusing can be reduced so that the reduction in size and weight of the entire optical system unit can be achieved. Note that the optical system unit includes, in addition to the optical system, a lens barrel or the like that accommodates the above focus driving mechanism.

In a case where the focus group is provided in the optical system, the arrangement of the focus group is not particularly limited, but it is preferable that any one lens group of the lens groups constituting the rear group or a part thereof is used as the focus group. Since the front group has a convergence action on the most object side and is constituted by a lens having a relatively large diameter on the most object side, the size and weight of the focus group can be easily reduced by providing the focus group as the lens group in the rear group or a part of the rear group.

The refractive power of the focus group may be positive or negative. In a case where the refractive power of the focus group is positive, it is preferable that the lens group on the object side has negative refractive power. In addition, in a case where the refractive power of the focus group is negative, it is preferable that the combined refractive power on the object side is positive. With this configuration, the lateral magnification of the focus group can be easily increased, and the focus sensitivity of the focus group can be easily increased. As a result, focusing can be performed with a small movement amount, which is preferable in terms of miniaturization.

Note that the number of focus groups included in the optical system is not limited to one, and a plurality of lens groups or a part of the plurality of lens groups may be used as the focus group. In other words, focusing may be performed by a floating method. By adopting the floating method, spherical aberration and image quality at the time of closer focusing can be improved, so that an optical system with higher optical performance can be realized, which is preferable.

(4) Anti-Vibration Group

In the optical system, the presence or absence of an anti-vibration group is not particularly limited. In order to correct an image blur caused by, for example, transmission of vibration to the imaging device at the time of photographing, the image can be electrically corrected or the image sensor can be moved. In a case where the anti-vibration group is not provided in the optical system, the image blur can be corrected by these methods.

In a case where the anti-vibration group is provided in the optical system, the image may be shifted by decentering at least one lens among the lenses constituting the optical system, and the method is not particularly limited.

For example, when at least one lens among the lenses constituting the optical system is set as the anti-vibration group, and the image is shifted by moving the anti-vibration group in a direction substantially orthogonal to the optical axis, the entire optical system unit including the lens barrel can be downsized, which is preferable in terms of downsizing.

When the anti-vibration group is provided in the optical system, the arrangement of the anti-vibration group is not particularly limited, but it is more preferable to provide the anti-vibration group in the rear group. Since the front group has a convergence action on the most object side and is constituted by a lens having a relatively large diameter on the most object side, the diameter of the incident light flux for the rear group can be made smaller than the diameter of the incident light flux for the front group. Therefore, by providing the anti-vibration group as the lens group in the rear group or a part of the rear group, it is possible to reduce the size and weight of the anti-vibration group as compared with the case where the anti-vibration group is provided in the front group.

In a case where the anti-vibration group is provided in the optical system, the number of lenses constituting the anti-vibration group is not particularly limited. It is preferable that the anti-vibration group includes a plurality of lenses because aberration variation during vibration proofing can be suppressed. At this time, it is preferable that the anti-vibration group includes at least one lens having negative refractive power and at least one lens having positive refractive power. In a case where the anti-vibration group includes at least one lens having negative refractive power and one lens having positive refractive power, occurrence of chromatic aberration at the time of vibration-proof can be suppressed, and an optical system having higher optical performance can be realized.

1-2. Conditional Expressions

In the optical system, it is preferable to adopt the above-described configuration and satisfy conditional expressions described below.

1-2-1. Conditional Expression (1)

It is preferable that the optical system satisfies the following conditional expression:

$$1.59 < NdLB < 2.30 \tag{1}$$

where

NdLB is a refractive index at a d-line of the lens B.

Conditional Expression (1) defines the refractive index at the d-line of the lens B closest to the image side in the rear group of the optical system. Since the optical system has a convergence action as a whole, the object side with respect to the lens B having the negative refractive power on the image side has positive refractive power in combination. It is important from the viewpoint of performance and manufacturability to suppress the radius of curvature of the most object-side surface of the lens B within an appropriate range with respect to the light beam incident on the lens B having the divergence action. Since the refractive power of the most object-side surface of the lens B is determined by the radius of curvature of the surface and the refractive index of the glass material, if the refractive index is defined in a certain range, the refractive power of the surface is easily suppressed in an appropriate range. Here, when Conditional Expression (1) is satisfied, an optical system having high off-axis performance can be achieved while suppressing the cost. In addition, in a case of a so-called composite aspherical lens in which an aspherical film is attached to the surface of the lens B closest to the image side in the rear group, NdLB is used as the refractive index of the base lens, not the refractive index of the aspherical film.

On the other hand, in a case where the numerical value of above Conditional Expression (1) is the upper limit or more, the cost of the glass material becomes too high, which is not preferable from the viewpoint of cost reduction. In a case where the numerical value of Conditional Expression (1) is the lower limit or less, it is difficult to correct the field curvature, and it is difficult to suppress the radius of curvature to an appropriate range, so that manufacturability is reduced. Therefore, it is not preferable in terms of off-axis performance and manufacturability.

In order to obtain the above effect, it is preferable that the upper limit value of Conditional Expression (1) is 2.20, 2.15, 2.12, 2.08, 2.06, 2.03, 2.01, 1.99, or 1.96 in this order. Further, it is preferable that the lower limit of Conditional Expression (1) is 1.60, 1.61, 1.62, 1.63, 1.64, 1.65, 1.67, or 1.69 in this order.

1-2-2. Conditional Expression (2)

It is preferable that the optical system satisfies the following conditional expression:

$$1.60 < TLSB/BF < 10.00 \tag{2}$$

where

TLSB is a distance from the diaphragm to an image-side surface of the lens B, and BF is an air conversion distance from a lens surface closest to the image side in the rear group to the image plane.

Above Conditional Expression (2) is an expression for defining the ratio between the distance from the diaphragm to the image-side surface of the lens B and the air conversion distance from the lens surface closest to the image side of the rear group to the image plane. In other words, the expression is equivalent to defining the position of the lens B closest to the image side in the rear group between the diaphragm and the image plane. In a case where Conditional Expression (2) is satisfied, the position of the lens B is optimized between the diaphragm and the image plane, coma aberration is easily corrected, and high performance is easily achieved.

On the other hand, in a case where the numerical value of Conditional Expression (2) is the upper limit or more, that is, the back focus is shortened. In that case, it is difficult to dispose an optical element such as a low-pass filter, which is not preferable. In addition, the diameter of the lens B closest to the image side is increased, which is not preferable. On the other hand, in a case where the numerical value of Conditional Expression (2) is the lower limit or less, the diaphragm and the lens B closest to the image side becomes close with respect to the back focus. Therefore, since the beam height of the off-axis beam in the lens B does not increase, the coma aberration correction capability decreases, and it is difficult to improve the performance, which is not preferable.

In order to obtain the above effect, it is preferable that the lower limit value of Conditional Expression (2) is 1.70, 1.80, 1.90, 2.00, 2.10, 2.20, 2.30, 2.40, 2.50, 2.60, 2.70, 2.80, 2.90, or 3.00 in this order. It is preferable that the upper limit of Conditional Expression (2) is 9.50, 9.00, 8.50, 8.00, 7.80, 7.60, or 7.40 in this order.

1-2-3. Conditional Expression (3)

It is preferable that the optical system satisfies the following conditional expression:

$$0.20 < fR/f < 1.05 \quad (3)$$

where fR is a focal length of the rear group, and f is a focal length of the optical system.

Conditional Expression (3) defines the ratio between the focal length of the rear group and the focal length of the optical system. In a case where Conditional Expression (3) is satisfied, the rear group has positive refractive power, and has a convergence action on the image side of the optical system. Therefore, a larger aperture is easily achieved in the optical system. In addition, since too strong refractive power causes an increase in the number of lenses and deterioration of aberration, there is an appropriate range for achieving both high performance and low cost. In a case where Conditional Expression (3) is satisfied, each aberration is corrected to an appropriate range, and a large-aperture optical system having a small number of lenses is achieved.

On the other hand, in a case where the numerical value of Conditional Expression (3) is the upper value limit or more, the focal length of the rear group with respect to the focal length of the optical system increases. In that case, since the convergence action of the rear group becomes weak, it is not preferable from the viewpoint of providing a larger aperture. On the other hand, in a case where the numerical value of Conditional Expression (3) is the lower limit value or less, the focal length of the rear group with respect to the focal length of the optical system decreases. In this case, aberration correction capability of the rear group is excessively required, which is not preferable in terms of high performance, and the number of lenses of the rear group is increased, which is not preferable in terms of cost.

In order to obtain the above effect, it is preferable that the upper limit value of Conditional Expression (3) is 1.03, 1.01, 0.99, 0.97, 0.95, 0.94, 0.93, 0.92, 0.91, 0.90, 0.89, 0.88, 0.87, 0.86, 0.85, 0.84, 0.83, 0.82, 0.81, 0.80, 0.79, 0.78, 0.77, 0.76, or 0.75 in this order. It is preferable that the lower limit of Conditional Expression (3) is 0.22, 0.24, 0.26, 0.28, 0.30, 0.32, 0.34, 0.36, 0.38, 0.40, 0.42, 0.44, 0.46, 0.48, 0.50, 0.52, 0.54, 0.56, 0.58, or 0.60 in this order.

1-2-4. Conditional Expression (4)

It is preferable that the optical system satisfies the following conditional expression:

$$-1.85 < FLB/f < -0.45 \quad (4)$$

where

FLB is a focal length of the lens B, and f is the focal length of the optical system.

Conditional Expression (4) defines the ratio between the focal length of the lens B closest to the image side in the rear group and the focal length of the optical system. By having the negative refractive power on the most image side, it is easy to take a telephoto configuration. However, if the refractive power of the lens closest to the image side becomes too strong, the magnification effect becomes large, and aberration occurs. Therefore, in order to achieve both miniaturization and high performance, it is important to set the refractive power of the lens closest to the image side within an appropriate refractive power range. In a case where Conditional Expression (4) is satisfied, both miniaturization and high performance can be achieved.

On the other hand, in a case where the numerical value of Conditional Expression (4) is the upper limit value or more, the refractive power of the lens B closest to the image side becomes too large, so that the magnification effect becomes large. This causes coma aberration and field curvature, making it difficult to achieve high performance, which is not preferable. In a case where the numerical value of Conditional Expression (4) is the lower limit or less, the refractive power of the lens B closest to the image side becomes too small, so that the power arrangement of the telephoto becomes weak. Therefore, it is difficult to reduce the size, which is not preferable.

In order to obtain the above effect, it is preferable that the upper limit value of Conditional Expression (4) is −0.46, −0.48, −0.50, −0.52, −0.54, −0.56, −0.58, −0.60, −0.62, −0.64, −0.66, or −0.68 in this order. Further, it is preferable that the lower limit of Conditional Expression (4) is −1.70, −1.65, −1.60, −1.55, −1.50, −1.45, −1.40, −1.35, −1.30, −1.25, −1.20, −1.15, −1.10, −1.05, −1.00, or −0.95 in this order.

1-2-5. Conditional Expression (5)

It is preferable that the optical system satisfies the following conditional expression:

$$25.00 < \nu dLA < 110.00 \quad (5)$$

where

νdLA is an Abbe number at a d-line of the lens A.

Conditional Expression (5) defines the Abbe number of the lens A having the positive refractive power on the most object side of the front group. In a case where Conditional Expression (5) is satisfied, the axial chromatic aberration of the optical system can be corrected, and the performance of the optical system can be easily improved.

On the other hand, in a case where the numerical value of Conditional Expression (5) is the lower limit value or less, the dispersion becomes large, and it becomes difficult to correct the axial chromatic aberration, which is not preferable. In a case where the numerical value of Conditional Expression (5) is the upper limit value or more, the dispersion becomes small, which is preferable in terms of chromatic aberration correction, but glass having a small dispersion is expensive, which is not preferable in terms of cost reduction.

In order to obtain the above effect, it is preferable that the upper limit value of Conditional Expression (5) is 100.00, 96.00, 95.00, 92.00, 91.00, 87.00, 83.00, 82.00, 79.00, 78.00, 76.50, 75.60, 75.00, 74.00, 73.00, 72.00, or 70.00 in this order. Further, it is preferable that the lower limit of Conditional Expression (5) is 26.00, 27.00, 28.00, 29.00, 30.00, 32.00, 35.00, 37.00, or 40.00 in this order.

1-2-6. Conditional Expression (6)

It is preferable that the optical system satisfies the following conditional expression:

$$18.00 < \nu dLB < 52.00 \tag{6}$$

where

νdLB is an Abbe number at a d-line of the lens B.

Conditional Expression (6) defines the Abbe number of the lens B having the negative refractive power on the most image side of the rear group. In a case where Conditional Expression (6) is satisfied, the lateral chromatic aberration of the optical system can be corrected, and the performance of the optical system can be easily improved.

On the other hand, in a case where the numerical value of Conditional Expression (6) is the lower limit value or less, it is difficult to correct the lateral chromatic aberration of a short wavelength, which is not preferable. In a case where the numerical value of Conditional Expression (6) is the upper limit value or more, it is difficult to correct the lateral chromatic aberration having a long wavelength, which is not preferable.

In order to obtain the above effect, it is preferable that the upper limit value of Conditional Expression (6) is 51.00, 50.00, 48.00, 47.00, 46.50, 46.00, 45.50, 45.00, 44.00, 43.00, or 42.00 in this order. Further, it is preferable that the lower limit of Conditional Expression (6) is 18.20, 18.40, 18.80, 19.20, 19.80, 20.30, 20.80, 21.00, 21.20, or 21.40 in this order.

1-2-7. Conditional Expression (7)

It is preferable that the optical system satisfies the following conditional expression:

$$-1.18 < CRBf/f < -0.20 \tag{7}$$

where

CRBf is a radius of curvature of the object-side surface of the lens B, and f is the focal length of the optical system.

Conditional Expression (7) defines the shape of the object-side surface of the lens B closest to the image side of the rear group. In a case where the ratio between the radius of curvature of the object-side surface of the lens B closest to the image side in the rear group and the focal length of the optical system satisfies the Conditional Expression (7), coma correction can be performed satisfactorily, and an optical system having high imaging performance can be realized. In addition, in a case of a so-called composite aspherical lens in which an aspherical film is attached to a lens unit having positive refractive power disposed closest to the object side, CRBf is not the radius of curvature of the aspherical film but the radius of curvature of the base lens.

On the other hand, in a case where the numerical value of the Conditional Expression (7) is the lower limit value or less, the radius of curvature of the object-side surface of the lens B closest to the image side increases, and the correction amount of the coma aberration decreases, which is not preferable in terms of performance improvement. In a case where the numerical value of Conditional Expression (7) is the upper limit value or more, the radius of curvature of the object-side surface of the lens B closest to the image side becomes small, and the coma aberration occurrence amount becomes large, which is not preferable in terms of high performance.

In order to obtain the above effect, it is preferable that the lower limit value of Conditional Expression (7) is −1.16, −1.13, −1.10, −1.00, −0.95, −0.90, −0.85, −0.80, −0.75, −0.70, −0.65, or −0.60 in this order. Further, it is preferable that the upper limit of Conditional Expression (7) is −0.23, −0.26, −0.28, −0.30, −0.32, −0.34, −0.36, −0.38, −0.40, or −0.42 in this order.

1-2-8. Conditional Expression (8)

It is preferable that the optical system satisfies the following conditional expression:

$$f/EPD < 2.60 \tag{8}$$

where f is the focal length of the optical system, and

EPD is an entrance pupil diameter of the optical system.

Conditional Expression (8) defines the ratio between the entrance pupil diameter of the optical system and the focal length of the optical system. In a case where Conditional Expression (8) is satisfied, it is easy to realize a larger aperture in the optical system.

On the other hand, in a case where the numerical value of Conditional Expression (8) is the upper limit or more, the entrance pupil diameter with respect to the focal length of the optical system decreases, which is not preferable in terms of providing a larger aperture. In addition, the lower limit value of the numerical value of Conditional Expression (8) is not defined, but an excessively large entrance pupil diameter leads to an increase in the number of lenses for aberration correction. Therefore, it is preferable that the lower limit value is 0.80 or more from the viewpoint of cost.

In order to obtain the above effect, it is preferable that the upper limit value of Conditional Expression (8) is 2.55, 2.51, 2.48, 2.45, 2.42, 2.38, 2.33, 2.28, 2.23, 2.18, 2.13, 2.10, 2.08, 2.05, 2.00, 1.96, 1.93, 1.90, 1.88, 1.85, 1.82, 1.79, 1.76, 1.73, 1.70, or 1.68 in this order. Further, it is preferable that the lower limit of Conditional Expression (8) is 0.85, 0.90, 0.94, 0.99, 1.05, 1.10, 1.18, 1.25, 1.30, or 1.38 in this order.

1-2-9. Conditional Expression (9)

It is preferable that the optical system satisfies the following conditional expression:

$$0.65 < FLR/f < 3.80 \tag{9}$$

where

FLA is a focal length of the lens A, and f is the focal length of the optical system.

Conditional Expression (9) defines the ratio between the focal length of the lens A closest to the object side in the front group and the focal length of the optical system. By having the positive refractive power on the most object side, it is easy to adopt a telephoto configuration. However, in a case where the refractive power of the lens group closest to the object side becomes too strong, the convergence action becomes large, and spherical aberration or field curvature occurs. Therefore, in order to achieve both miniaturization and high performance, it is important to set the refractive power of the lens closest to the object side within an appropriate refractive power range. In a case where Conditional Expression (9) is satisfied, both miniaturization and high performance can be achieved.

On the other hand, in a case where the numerical value of Conditional Expression (9) is the upper limit value or more, the refractive power of the lens A closest to the object side becomes too small, so that the convergence action becomes small. Therefore, it is difficult to reduce the size, which is not preferable. In a case where the numerical value of Conditional Expression (9) is the lower limit or less, the refractive power of the lens A closest to the object side becomes too large, so that the convergence action becomes large. This causes spherical aberration and field curvature, making it difficult to achieve high performance, which is not preferable.

In order to obtain the above effect, it is preferable that the upper limit value of Conditional Expression (9) is 3.70, 3.60, 3.50, 3.40, or 3.30 in this order. Further, it is preferable that the lower limit of Conditional Expression (9) is 0.70, 0.75, 0.80, 0.85, 0.90, 0.95, 1.00, 1.05, 1.10, 1.15, 1.20, 1.25, 1.30, 1.35, or 1.40 in this order.

1-2-10. Conditional Expression (10)

It is preferable that the optical system satisfies the following conditional expression:

$$-3.20 < (CRBf + CRBr)/(CRBf - CRBr) < -0.53 \tag{10}$$

where

CRBf is the radius of curvature of the object-side surface of the lens B, and

CRBr is a radius of curvature of the image-side surface of the lens B.

Conditional Expression (10) defines the shape of the lens B arranged closest to the image plane side. In a case where the range of Conditional Expression (10) is satisfied, the lens shape has a small absolute value of the radius of curvature of the object-side surface, and occurrence of coma aberration is suppressed, which is preferable for high performance.

On the other hand, in a case where the numerical value of Conditional Expression (10) is the upper limit value or more, the negative refractive power of the image-side surface becomes strong, so that it becomes difficult to correct coma aberration, which is not preferable in terms of high performance. In a case where the numerical value of Conditional Expression (10) is the lower limit or less, the radius of curvature of the object-side surface becomes large, and the coma aberration is hardly corrected. Furthermore, since the negative refractive power of the lens B becomes weak, downsizing is difficult in both the entire length direction and the radial direction, which is not preferable.

In order to obtain the above effect, it is preferable that the upper limit value of Conditional Expression (10) is −0.54, −0.55, −0.56, −0.58, −0.60, −0.62, −0.64, −0.66, −0.68, or −0.70 in this order. Further, it is preferable that the lower limit of Conditional Expression (10) is −3.10, −3.00, −2.90, −2.80, −2.70, −2.60, −2.50, −2.40, −2.30, −2.20, −2.10, −2.00, −1.90, −1.80, −1.70, or −1.60 in this order.

1-2-11. Conditional Expression (11)

It is preferable that the optical system satisfies the following conditional expression:

$$1.42 < NdLA < 2.30 \tag{11}$$

where

NdLA is a refractive index at the d-line of the lens A.

Conditional Expression (11) defines the refractive index at the d-line of the lens A closest to the object side in the front group. In a case where Conditional Expression (11) is satisfied, the spherical aberration generation amount falls within an appropriate range while the refractive power of the lens A is made appropriate.

On the other hand, in a case where the numerical value of Conditional Expression (11) is the lower limit value or less, the refractive index decreases, and the radius of curvature of the surface closest to the object side decreases. In that case, it is difficult to correct spherical aberration, which is not preferable. In a case where the numerical value of Conditional Expression (11) is the upper limit value or more, the refractive index increases. Since glass having a high refractive index is expensive, a refractive index that is too high is not preferable in terms of cost reduction. In addition, since glass having a high refractive index has a large specific gravity, it is not preferable also from the viewpoint of weight reduction.

In order to obtain the above effect, it is preferable that the lower limit value of Conditional Expression (11) is 1.45, 1.49, 1.50, 1.52, 1.54, 1.56, 1.58, 1.60, 1.62, 1.64, 1.66, 1.68, 1.70, 1.72, 1.74, 1.76, 1.78, or 1.80 in this order. Further, it is preferable that the upper limit of Conditional Expression (11) is 2.25, 2.20, 2.18, 2.17, 2.16, 2.15, 2.14, 2.13, 2.12, 2.11, or 2.10 in this order.

1-2-12. Conditional Expression (12)

It is preferable that the optical system satisfies the following conditional expression:

$$0.10 < BF/f < 0.55 \tag{12}$$

where

BF is the air conversion distance from the lens surface closest to the image side in the rear group to the image plane, and f is the focal length of the optical system.

Conditional Expression (12) defines the ratio between a value obtained by air-converting the distance on the optical axis from the most image-side surface to the image plane of the optical system and the focal length of the optical system. It is necessary to dispose an optical element such as a low-pass filter or a cover glass between the most image-side surface and the image plane of the optical system. Therefore, it is important to set the back focus of the optical system to an optimum range in order to arrange the optical element while achieving miniaturization. In a case where Conditional Expression (12) is satisfied, the back focus of the optical system is in an optimum range, so that downsizing can be easily achieved.

On the other hand, in a case where the numerical value of Conditional Expression (12) is the upper limit or more, the total optical length of the optical system increases, and the weight including the mechanism increases. Therefore, it is not preferable from the viewpoint of miniaturization and weight reduction. On the other hand, in a case where that the numerical value of Conditional Expression (12) is the lower limit or less, it is difficult to dispose an optical element such as a low-pass filter or a cover glass, which is not preferable. In addition, the diameter of the lens B which is the final lens is increased, which is not preferable.

In order to obtain the above effect, it is preferable that the upper limit value of Conditional Expression (12) is 0.54, 0.52, 0.50, 0.48, 0.46, 0.45, 0.44, 0.43, 0.41, 0.39, 0.37, 0.35, or 0.34 in this order. Further, it is preferable that the lower limit of Conditional Expression (6) is 0.11, 0.12, 0.13, 0.14, 0.15, 0.16, 0.17, or 0.18 in this order.

1-2-13. Conditional Expression (13)

It is preferable that the optical system satisfies the following conditional expression:

$$0.20 < CRsz/f < 25.00 \tag{13}$$

where

CRsz is a radius of curvature of the image-side surface of the diaphragm, and f is the focal length of the optical system.

Conditional Expression (13) defines the ratio between the radius of curvature of the image-side surface of the diaphragm, that is, the radius of curvature of the last object-side surface of the rear group, and the focal length of the optical system. In a case where Conditional Expression (13) is satisfied, the surface on the most object side of the rear group has a convex surface with respect to the object side, so that the aberration generation amount on the surface on the most object side of the rear group can be within an appropriate range. Accordingly, high performance is achieved. In addition, the optical system can be easily downsized by the convergence action on the most object side of the rear group.

On the other hand, in a case where the numerical value of Conditional Expression (13) is the lower limit value or less, the radius of curvature of the surface of the rear group on the most object side becomes too small, so that spherical aberration and coma aberration occur, and it becomes difficult to improve the performance, which is not preferable. In a case where the numerical value of Conditional Expression (13) is the upper limit value or more, the radius of curvature of the surface of the rear group on the most object side becomes too large. Therefore, the total optical length becomes long, which is not preferable in terms of miniaturization. In addition, in a case where the radius of curvature of the surface on the aperture image side increases, the harmful light reflected on the image plane is incident on the imaging surface again, and a ghost is likely to occur. Therefore, it is not preferable in terms of high performance.

In order to obtain the above effect, it is preferable that the upper limit value of Conditional Expression (13) is 20.00, 15.00, 12.00, 10.00, 9.00, 8.00, 7.00, 6.00, 5.50, 5.00, 4.50, 4.00, 3.50, 3.20, 3.00, 2.80, 2.60, 2.40, or 2.20 in this order. Further, it is preferable that the lower limit of Conditional Expression (13) is 0.22, 0.24, 0.26, 0.28, 0.30, 0.32, 0.34, 0.36, 0.38, 0.40, 0.42, 0.44, 0.46, 0.48, 0.50, 0.52, 0.54, 0.56, 0.58, or 0.60 in this order.

1-2-14. Conditional Expression (14)

It is preferable that the optical system satisfies the following conditional expression:

$$1.90 < |ff|/fR < 1000.00 \tag{14}$$

where ff is a focal length of the front group, and fR is the focal length of the rear group.

Conditional Expression (14) defines the ratio of the focal length of the front group to the focal length of the rear group. In a case where Conditional Expression (14) is satisfied, the power arrangement of the front group and the rear group is appropriate, and larger aperture is provided and the number of lens components is optimized. That is, it is easy to achieve both a larger aperture and a lower cost.

On the other hand, in a case where the numerical value of Conditional Expression (14) is the upper limit value or more, the refractive power of the rear group becomes too strong, and aberration correction becomes difficult unless the number of lenses constituting the rear group is increased. Therefore, it is not preferable from the viewpoint of achieving both cost reduction and high performance. In a case where the value of Conditional Expression (14) is the lower limit or less, the refractive power of the rear group becomes too weak, which is not preferable in terms of providing a larger aperture.

In order to obtain the above effect, it is preferable that the upper limit value of Conditional Expression (14) is 800.00, 600.00, 400.00, 200.00, 120.00, 100.00, 75.00, 65.00, 50.00, 45.00, 42.00, 40.00, 38.00, or 36.00 in this order. Further, it is preferable that the lower limit of Conditional Expression (14) is 1.95, 2.00, 2.05, 2.10, 2.15, 2.20, 2.25, 2.30, 2.40, or 2.45 in this order.

1-2-15. Conditional Expression (15)

It is preferable that the optical system satisfies the following conditional expression:

$$-0.89 < FLB/FLA < -0.20 \tag{15}$$

where

FLA is the focal length of the lens A, and

FLB is the focal length of the lens B.

Conditional Expression (15) defines the ratio between the focal length of the lens A and the focal length of the lens B. In a case where Conditional Expression (15) is satisfied, the telephoto-type power arrangement is easily obtained, so that the optical system can be downsized in the optical full length direction. However, excessive miniaturization makes it difficult to correct aberrations and deteriorates error sensitivity. As a result, there is an appropriate range for the ratio between the focal length of the lens A and the focal length of the lens B. Here, in a case where Conditional Expression (15) is satisfied, both the reduction in size and weight and the high-performance optical system can be achieved.

On the other hand, in a case where the numerical value of Conditional Expression (15) is the upper limit or more, the ratio of the focal length of the lens B to the focal length of the lens A increases, and the power arrangement of the telephoto becomes weak. In that case, the total optical length becomes too large with respect to the focal length, and the weight including the mechanical structure becomes heavy, which is not preferable in terms of weight reduction. In a case where the numerical value of Conditional Expression (15) is the lower limit or less, the ratio of the focal length of the lens B to the focal length of the lens A becomes small, and the magnification effect on the lens closest to the image side becomes relatively large. In that case, the aberration enlargement action on the image side in the optical system becomes large, which is not preferable in terms of high performance.

In order to obtain the above effect, it is preferable that the upper limit value of Conditional Expression (15) is −0.21, −0.22, −0.23, −0.24, or −0.25 in this order. Further, it is preferable that the lower limit of Conditional Expression (15) is −0.87, −0.85, −0.83, −0.81, −0.79, −0.77, −0.75, −0.73, −0.71, −0.69, −0.67, −0.65, −0.63, −0.61, −0.59, −0.57, or −0.55 in this order.

1-2-16. Conditional Expression (16)

It is preferable that the optical system satisfies the following conditional expression:

$$0.30 < TLAS/TLSB < 0.92 \tag{16}$$

where

TLAS is a distance from the object-side surface of the lens A to the diaphragm, and TLSB is the distance from the diaphragm to the image-side surface of the lens B.

Conditional Expression (16) defines the ratio between the distance from the object-side surface of the lens A to the diaphragm and the distance from the diaphragm to the image-side surface of the lens B. In a case where Conditional Expression (16) is satisfied, the position of the diaphragm with respect to the lens A closest to the object side and the lens B closest to the image side is appropriate, so that both the diameters of the lens A and the lens B can be downsized. Since the increase in the lens diameter can be avoided, the volume of the lens is reduced, and the weight reduction of the lens is achieved.

On the other hand, in a case where the numerical value of Conditional Expression (16) is the upper limit or more, the position of the diaphragm with respect to the lens A closest to the object side and the lens B closest to the image side becomes close to the lens B. As a result, since the diameter of the lens A increases, the volume of the lens A increases, the weight increases, and the cost also increases, which is not preferable in terms of weight reduction and cost reduction. In a case where the numerical value of Conditional Expression (16) is the lower limit or less, the position of the diaphragm with respect to the lens A closest to the object side and the lens B closest to the image side is close to the lens A. As a result, since the diameter of the lens B increases, the volume of the lens B increases, the weight increases, and the cost also increases, which is not preferable in terms of weight reduction and cost reduction.

In order to obtain the above effect, it is preferable that the upper limit value of Conditional Expression (16) is 0.91, 0.90, 0.89, 0.88, 0.87, 0.86, 0.85, 0.84, 0.83, or 0.82 in this order. Further, it is preferable that the lower limit of Conditional Expression (16) is 0.31, 0.32, 0.33, 0.34, 0.35, 0.36, or 0.37 in this order.

1-2-17. Conditional Expression (17)

It is preferable that the optical system satisfies the following conditional expression:

$$-4.50 < CRBf/BF < -1.20 \tag{17}$$

where

CRBf is the radius of curvature of the object-side surface of the lens B, and

BF is the air conversion distance from the lens surface in the rear group closest to the image side to the image plane.

Conditional Expression (17) defines the shape of the object-side surface of the lens B closest to the image side in the rear group. In a case where the ratio between the radius of curvature of the object-side surface of the lens B closest to the image side in the rear group and the air conversion distance from the lens surface closest to the image side in the rear group to the image plane satisfies Conditional Expression (17), frame correction can be performed satisfactorily, and an optical system having high imaging performance can be realized. In addition, in a case of a so-called composite aspherical lens in which an aspherical film is attached to a lens unit having positive refractive power disposed closest to the object side, CRBf is not the radius of curvature of the aspherical film but the radius of curvature of the base lens.

On the other hand, in a case where the numerical value of Conditional Expression (17) is the lower limit or less, the radius of curvature of the object-side surface of the lens B closest to the image side becomes large, and the correction amount of the coma aberration becomes small, which is not preferable in terms of performance improvement. In a case where the numerical value of Conditional Expression (17) is the upper limit value or more, that is, the radius of curvature of the object-side surface of the lens B closest to the image side becomes small, and the coma aberration occurrence amount becomes large, which is not preferable in terms of high performance.

In order to obtain the above effect, it is preferable that the upper limit value of Conditional Expression (17) is −1.24, −1.26, −1.28, −1.30, −1.32, −1.34, −1.36, −1.38, −1.40, −1.42, −1.44, or −1.46 in this order. Further, it is preferable that the lower limit of Conditional Expression (17) is −4.45, −4.40, −4.35, −4.30, −4.25, −4.20, −4.15, −4.10, or −4.05 in this order.

1-2-18. Conditional Expression (18)

It is preferable that the optical system satisfies the following conditional expression:

$$0.30 < \nu dLR/\nu dLB < 3.00 \tag{18}$$

where

νdLA is the Abbe number at the d-line of the lens A,

νdLB is the Abbe number at the d-line of the lens B.

Conditional Expression (18) defines the ratio between the Abbe number of the lens A at the d-line and the Abbe number of the lens B at the d-line. In a case where Conditional Expression (18) is satisfied, both the axial chromatic aberration and the lateral chromatic aberration are corrected, and high performance is achieved.

On the other hand, in a case where the numerical value of Conditional Expression (18) is the lower limit value or less, the Abbe number of the lens A at the d-line becomes too small, so that it becomes difficult to correct the axial chromatic aberration, which is not preferable in terms of high performance. In addition, if the numerical value of Conditional Expression (18) is the upper limit value or more, the Abbe number of the lens B at the d-line becomes too small, so that it becomes difficult to correct the lateral chromatic aberration, which is not preferable in terms of high performance.

In order to obtain the above effect, it is preferable that the upper limit value of Conditional Expression (18) is 2.90, 2.80, 2.70, 2.60, 2.50, 2.40, 2.30, 2.20, 2.10, 2.00, 1.90, or 1.85 in this order. Further, it is preferable that the lower limit of Conditional Expression (18) is 0.35, 0.40, 0.45, 0.50, 0.55, 0.60, 0.65, 0.70, 0.75, 0.80, 0.85, 0.90, 0.95, or 0.99 in this order.

1-2-19. Conditional Expression (19)

It is preferable that the optical system satisfies the following conditional expression:

$$1.00 < TTL/f < 3.50 \qquad (19)$$

where

TTL is a distance from the lens surface closest to the object side of the front group to the image plane, and f is the focal length of the optical system.

Conditional Expression (19) defines the ratio between the optical total length and the focal length of the optical system. Reducing the overall optical length with respect to the focal length makes it difficult to correct aberrations and causes deterioration in error sensitivity. In addition, in a case where the optical overall length is made too large with respect to the focal length, the weight including the mechanical structure becomes heavy, and thus, there is an appropriate range of the ratio between the overall length and the focal length. Here, in a case where Conditional Expression (19) is satisfied, both the reduction in size and weight and the high-performance optical system can be achieved.

On the other hand, in a case where the numerical value of Conditional Expression (19) is the upper limit or more, the optical total length becomes too large with respect to the focal length, and the weight including the mechanical structure becomes heavy, which is not preferable from the viewpoint of weight reduction. In a case where the numerical value of Conditional Expression (19) is the lower limit or less, the total optical length becomes too small with respect to the focal length, and a large number of lenses are required in terms of aberration correction, which is not preferable in terms of cost. Further, this causes deterioration in manufacturability, which is not preferable in terms of high performance.

In order to obtain the above effect, it is preferable that the upper limit value of Conditional Expression (19) is 3.40, 3.30, 3.20, 3.10, 3.00, 2.90, 2.80, 2.70, 2.60, 2.50, 2.40, 2.30, 2.20, 2, 10, or 2.00 in this order. Further, it is preferable that the lower limit of Conditional Expression (19) is 1.02, 1.04, 1.06, 1.08, 1.10, 1.12, or 1.13 in this order.

2. Imaging Device and Moving Body

Next, an imaging device according to the present invention will be described. The imaging device according to the present invention includes an optical system according to the present invention, and an image sensor that receives an optical image formed by the optical system and converts the optical image into an electrical image signal.

Here, the image sensor and the like are not particularly limited, and a solid-state image sensor such as a charge coupled device (CCD) sensor or a complementary metal oxide semiconductor (CMOS) sensor can also be used.

The imaging device according to the present invention is suitable for an imaging device using these solid-state image sensors such as a digital camera, a video camera, a monitoring camera, an in-vehicle camera, a drone camera, and a medical camera. Furthermore, the imaging device may be a lens fixed type imaging device in which the lens is fixed to a housing, or may be a lens interchangeable type imaging device such as a single lens reflex camera or a mirrorless single lens camera. In particular, since the optical system according to the present invention is small, it is suitable for an imaging device mounted on a moving body such as a vehicle or a drone.

It is more preferable that the imaging device and the moving body according to the present invention include an image processing unit that electrically processes captured image data acquired by the image sensor to change the shape of the captured image, an image correction data holding unit that holds image correction data, an image correction program, and the like used to process the captured image data in the image processing unit, and the like. In a case where the optical system is downsized, distortion (deformation) of the shape of the image data formed on the imaging plane is likely to occur. At that time, it is preferable that the image correction data holding unit is caused to hold distortion correction data for correcting distortion of the shape of the image data in advance, and the image processing unit corrects the distortion of the shape of the image data using the distortion correction data held in the image correction data holding unit. With such an imaging device, it is possible to further reduce the size of the optical system, obtain an excellent image data, and reduce the size of the entire imaging device.

In the imaging device and the moving body according to the present invention, it is preferable to cause the image correction data holding unit to hold the lateral chromatic aberration correction data in advance, and cause the image processing unit to perform the lateral chromatic aberration correction of the image data using the lateral chromatic aberration correction data held in the image correction data holding unit. The number of lenses constituting the optical system can be reduced by correcting the lateral chromatic aberration, that is, the color distortion by the image processing unit. Therefore, according to such an imaging device, it is possible to further reduce the size of the optical system, to obtain an excellent image data, and to reduce the size of the entire imaging device.

Next, the present invention will be specifically described with reference to Examples. However, the present invention is not limited to the following Examples. In each lens cross-sectional view, the left side is the object side and the right side is the image side as viewed in the drawing.

Example 1

FIG. 1 is a lens cross-sectional view illustrating a configuration of an optical system of Example 1 according to the present invention. The optical system includes, in order from the object side, a front group GF having positive refractive power, a diaphragm, and a rear group GR having positive refractive power.

The front group GF having positive refractive power includes, in order from the object side, a positive meniscus lens L1 having a convex shape in the object side, a positive meniscus lens L2 having a convex shape in the object side, a positive meniscus lens L3 having a convex shape in the object side, and a negative meniscus lens L4 having a convex shape in the objects side. Here, the positive meniscus lens L1 having a convex shape in the object side corresponds to the lens A of the present invention.

The rear group GR having positive refractive power includes, in order from the object side, a biconvex lens L5 having positive refractive power and having a convex surface on both the object-side surface and the image-side surface, and a negative meniscus lens L6 having a concave shape in the object side. Here, the negative meniscus lens L6 having a concave shape in the object side corresponds to the lens B of the present invention.

Note that "IMG" in the drawing represents an image plane. The image plane IMG is an imaging surface of the solid-state image sensor such as a CCD sensor or a CMOS sensor described above. The light incident from the object side of the optical system forms an image on the image plane. The solid-state image sensor converts the received optical image into an electrical image signal. An image processing unit (image processing processor or the like) included in an imaging device or the like generates a digital image corresponding to an image of a subject on the basis of the electrical image signal output from the image sensor. The digital image can be recorded on a recording medium such as a hard disk device (HDD), a memory card, an optical disk, or a magnetic tape. The image plane may be a film surface of a silver halide film.

In addition, "CG" in the drawing represents an image plane. The image plane CG is an optical block. The optical block CG corresponds to an optical filter, a cover glass, a crystal low-pass filter, an infrared cut filter, or the like. The reference numerals (IMG and CG) denote the same elements in the drawings illustrated in other embodiments, and thus the description thereof will be omitted below.

Example 2

Figure 3:
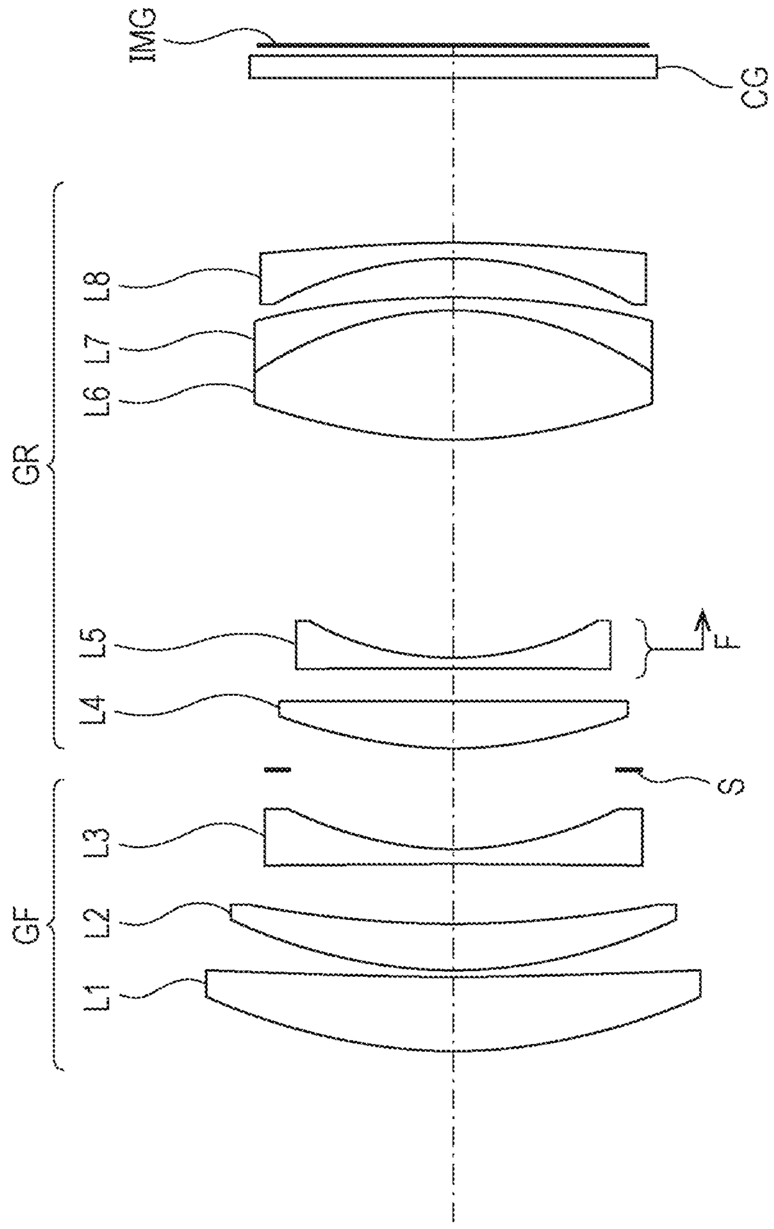
FIG. 3 is a cross-sectional view of an optical system according to Example 2 of the present invention at the time of photographing a subject at infinity.
Figure 4:
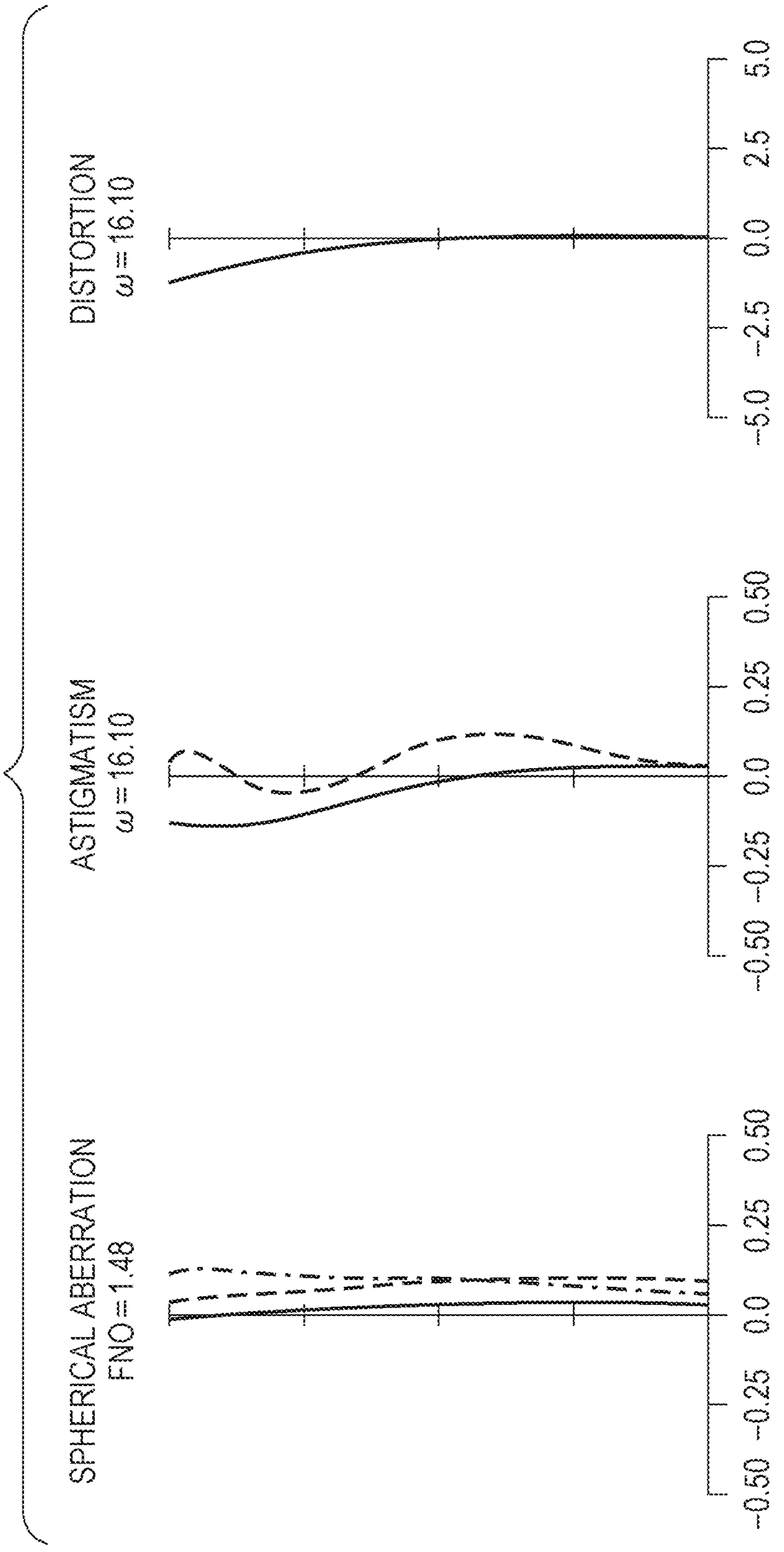
FIG. 4 is a spherical aberration diagram, an astigmatism diagram, and a distortion diagram of the optical system according to Example 2 of the present invention at the time of photographing a subject at infinity.

FIG. 3 is a lens cross-sectional view illustrating a configuration of an optical system of Example 2 according to the present invention. The optical system includes, in order from the object side, a front group GF having positive refractive power, a diaphragm, and a rear group GR having positive refractive power.

The front group GF having positive refractive power includes, in order from the object side, a positive meniscus lens L1 having a convex shape in the object side, a positive meniscus lens L2 having a convex shape in the object side, and a biconcave lens L3 having negative refractive power and having a concave surface on both the object-side surface and the image-side surface. Here, the positive meniscus lens L1 having a convex shape in the object side corresponds to the lens A of the present invention.

The rear group GR having positive refractive power includes, in order from the object side, a positive meniscus lens L4 having a convex shape in the object side, a biconcave lens L5 having negative refractive power and having a concave surface on both an object-side surface and an image-side surface, a cemented lens of a biconvex lens L6 having positive refractive power and having a convex surface on both an object-side surface and an image-side surface and a negative meniscus lens L7 having a concave shape in the object side, and a negative meniscus lens L8 having a concave shape in the object side. Here, the negative meniscus lens L8 having a concave shape in the object side corresponds to the lens B of the present invention.

Here, the biconcave lens L5, which has negative refractive power and in which both the object-side surface and the image-side surface are concave surfaces, corresponds to a focus group that performs focusing from an infinite-distance object to a finite-distance object by approaching to the image side.

Example 3

Figure 5:
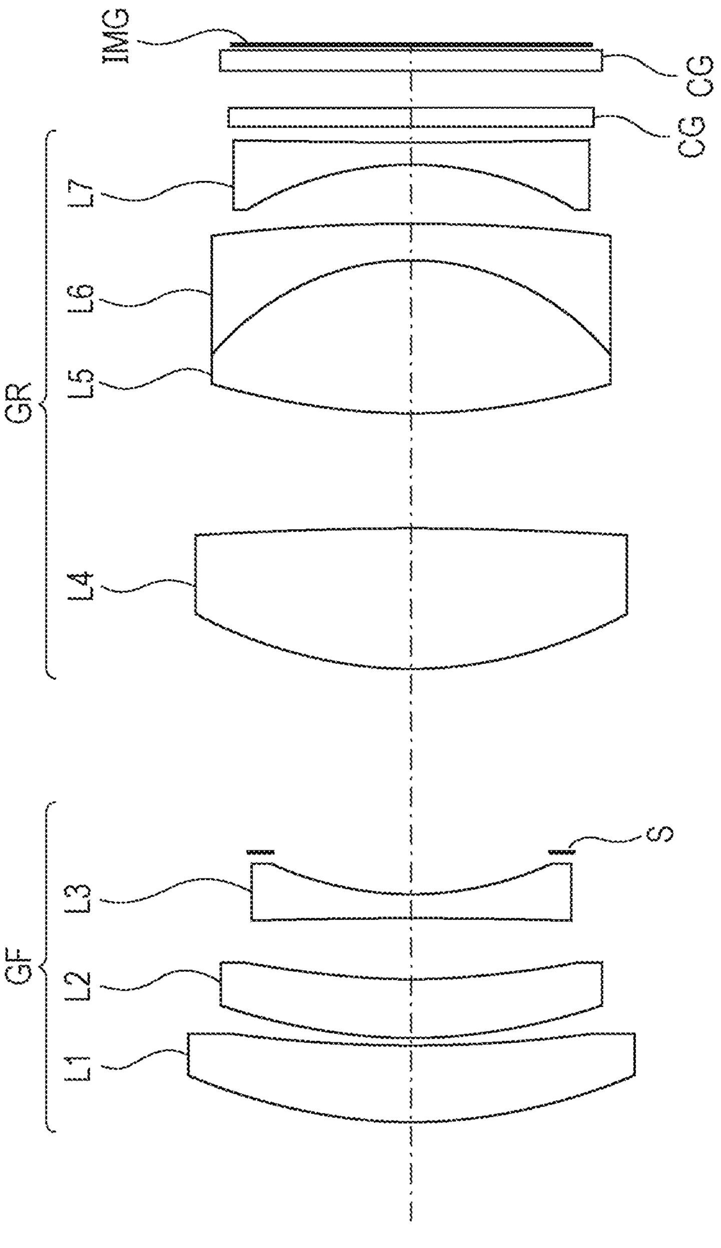
FIG. 5 is a cross-sectional view of an optical system according to Example 3 of the present invention.
Figure 6:
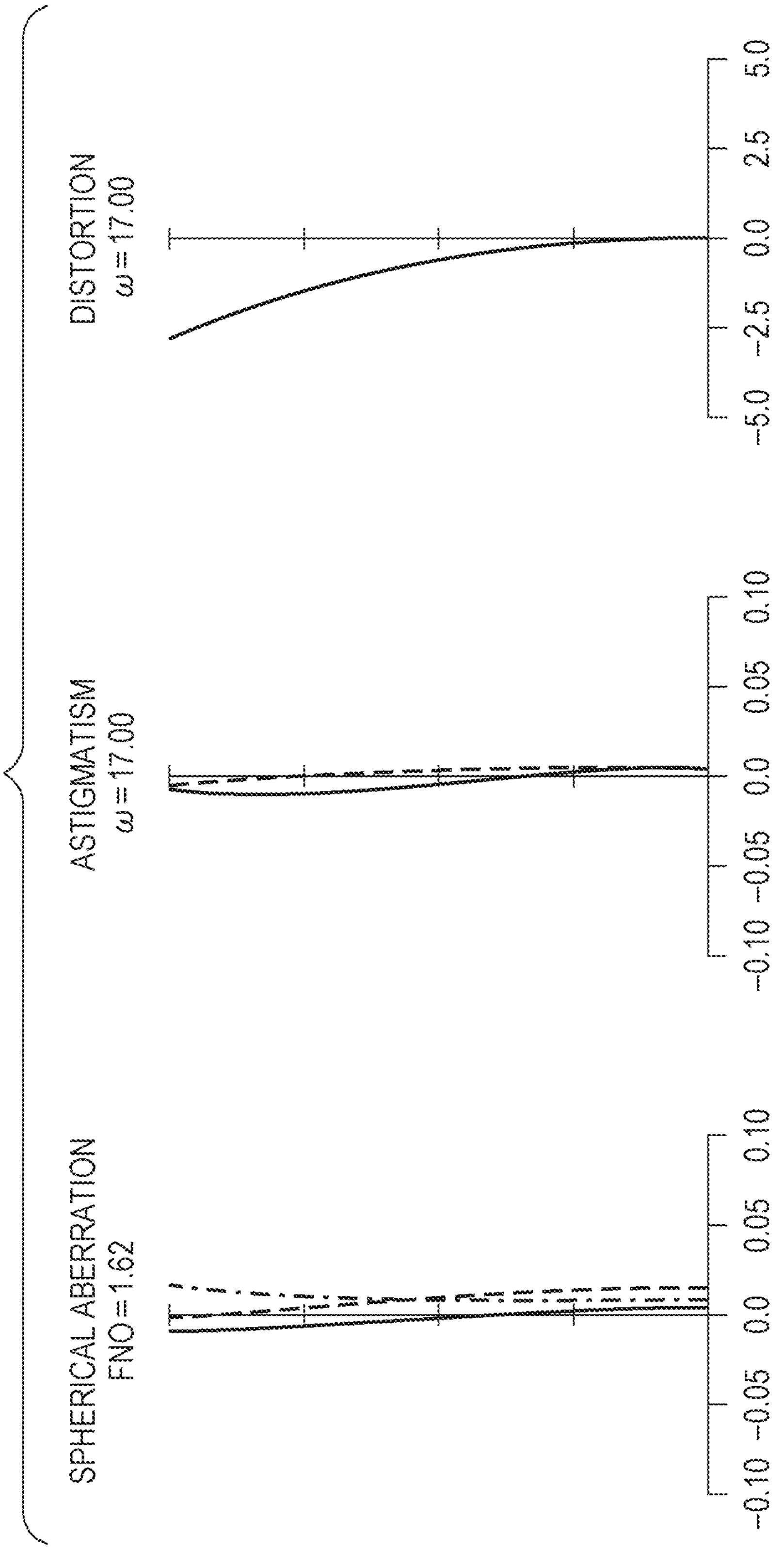
FIG. 6 is a spherical aberration diagram, an astigmatism diagram, and a distortion diagram of the optical system according to Example 3 of the present invention.

FIG. 5 is a lens cross-sectional view illustrating a configuration of an optical system of Example 3 according to the present invention. The optical system includes, in order from the object side, a front group GF having negative refractive power, a diaphragm, and a rear group GR having positive refractive power.

The front group GF having negative refractive power includes, in order from the object side, a positive meniscus lens L1 having a convex shape in the object side, a positive meniscus lens L2 having a convex shape in the object side, and a biconcave lens L3 having negative refractive power and in which both the object-side surface and the image-side surface are concave surfaces. Here, the positive meniscus lens L1 having a convex shape in the object side corresponds to the lens A of the present invention.

The rear group GR having positive refractive power includes, in order from the object side, a biconvex lens L4 having positive refractive power and having a convex surface on both the object-side surface and the image-side surface, a cemented lens including a biconvex lens L5 having positive refractive power and having a convex surface on both the object-side surface and the image-side surface, and a negative meniscus lens L6 having a concave shape in the object side, and a biconcave lens L7 having negative refractive power and having a concave surface on both the object-side surface and the image-side surface. Here, the biconcave lens L7 having negative refractive power and having a concave surface on both the object-side surface and the image-side surface corresponds to the lens B in the present invention.

Example 4

Figure 7:
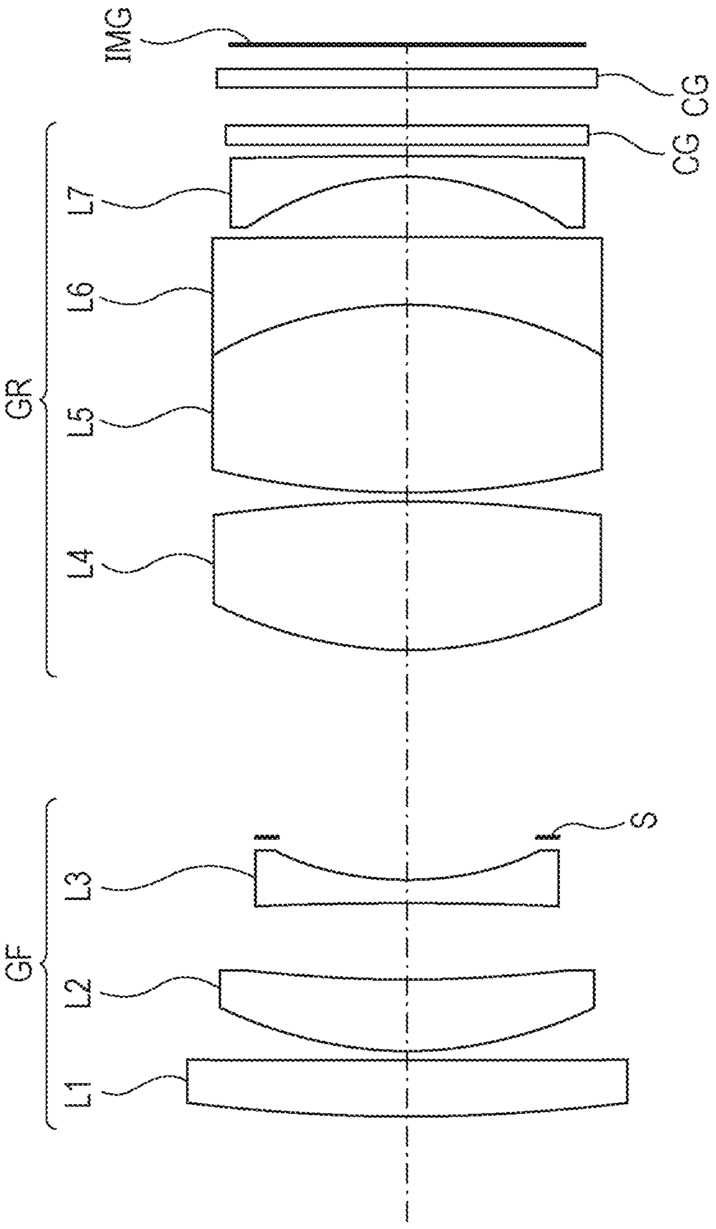
FIG. 7 is a cross-sectional view of an optical system according to Example 4 of the present invention.
Figure 8:
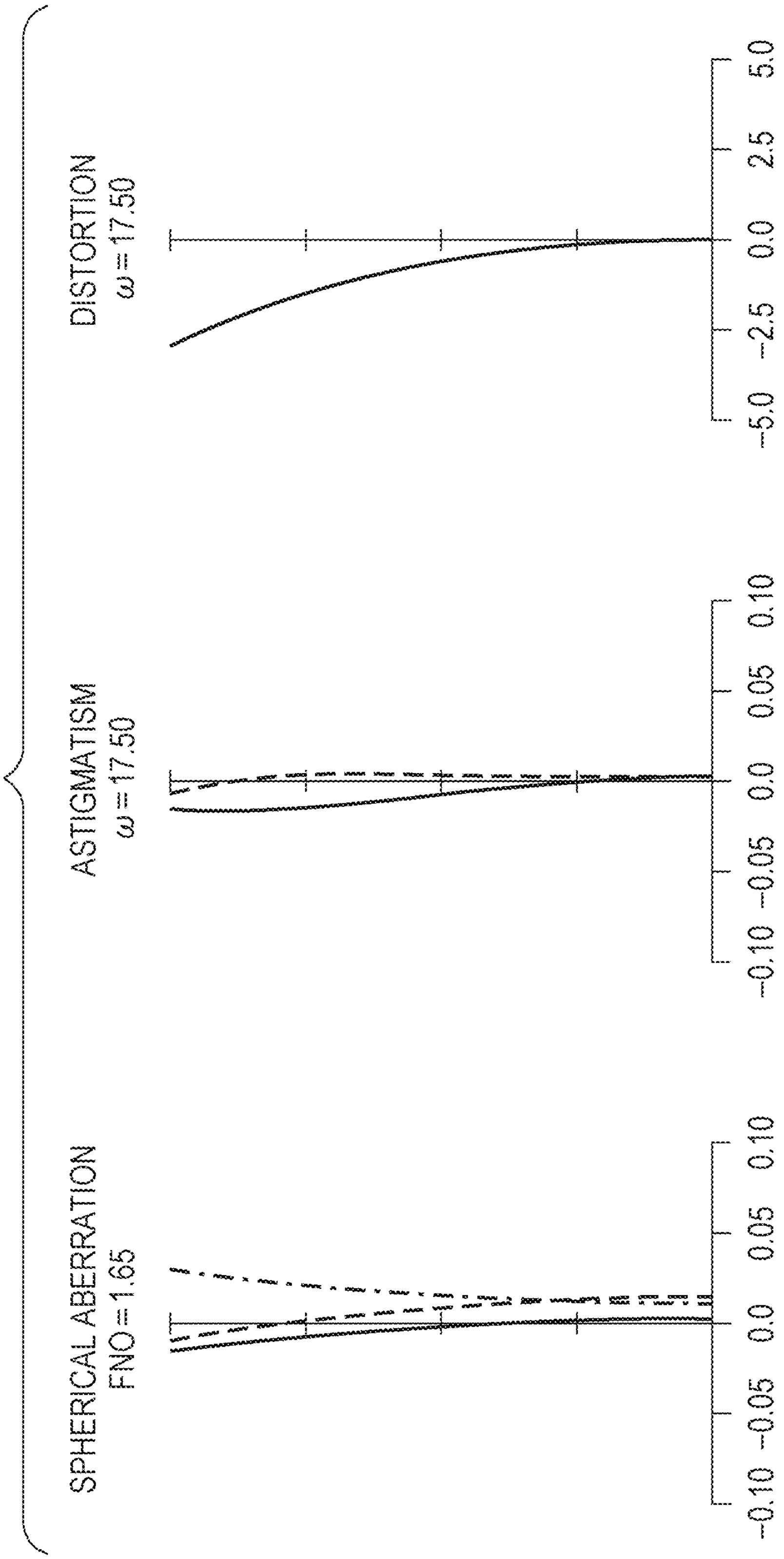
FIG. 8 is a spherical aberration diagram, an astigmatism diagram, and a distortion diagram of the optical system according to Example 4 of the present invention.

FIG. 7 is a lens cross-sectional view illustrating a configuration of an optical system of Example 4 according to the present invention. The optical system includes, in order from the object side, a front group GF having positive refractive power, a diaphragm, and a rear group GR having positive refractive power.

The front group GF having positive refractive power includes, in order from the object side, a biconvex lens L1 having positive refractive power and having a convex surface on both the object-side surface and the image-side surface, a positive meniscus lens L2 having a convex shape in the object side, and a biconcave lens L3 having negative refractive power and having a concave surface on both the object-side surface and the image-side surface. Here, the biconvex lens L1 having positive refractive power and having a convex surface on both the object-side surface and the image-side surface corresponds to the lens A of the present invention.

The rear group GR having positive refractive power includes, in order from the object side, a biconvex lens L4 having positive refractive power and having a convex surface on both the object-side surface and the image-side surface, a cemented lens including a biconvex lens L5 having positive refractive power and having a convex surface on both the object-side surface and the image-side surface, and a negative meniscus lens L6 having a concave shape in the object side, and a negative meniscus lens L7 having a concave shape in the object side. Here, the negative meniscus lens L7 having a concave shape in the object side corresponds to the lens B of the present invention.

Example 5

Figure 9:
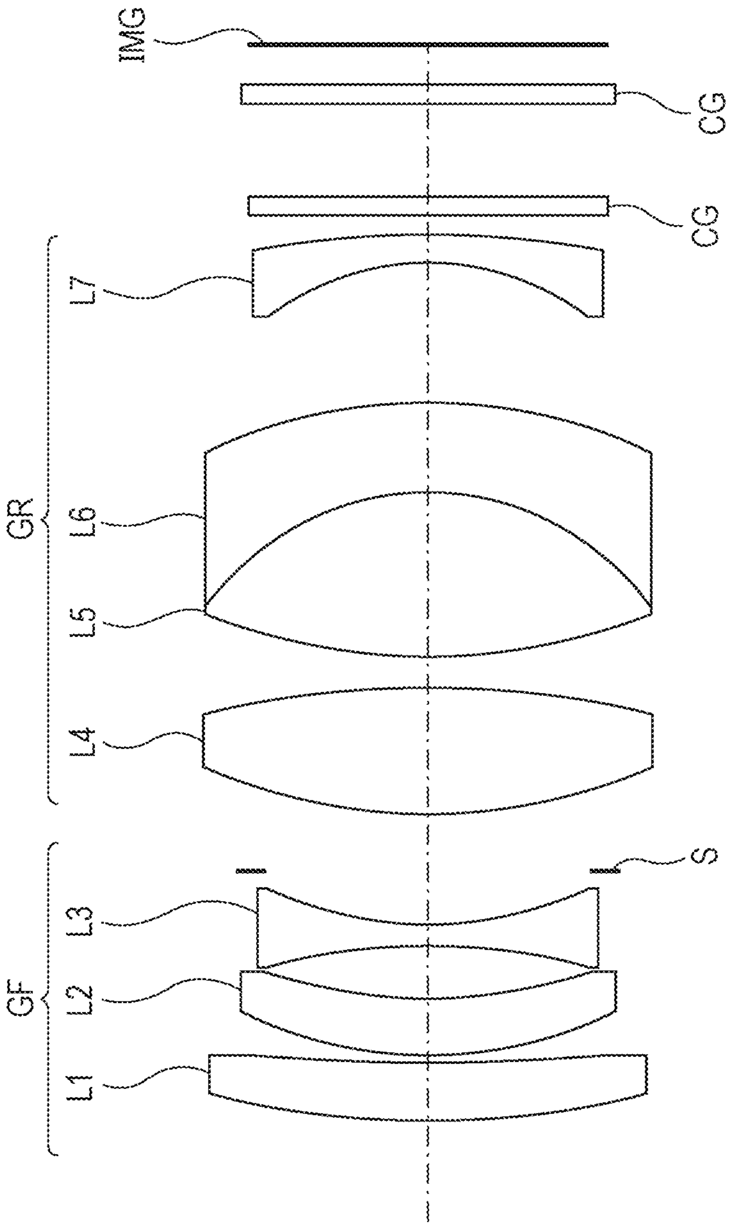
FIG. 9 is a cross-sectional view of an optical system according to Example 5 of the present invention.
Figure 10:
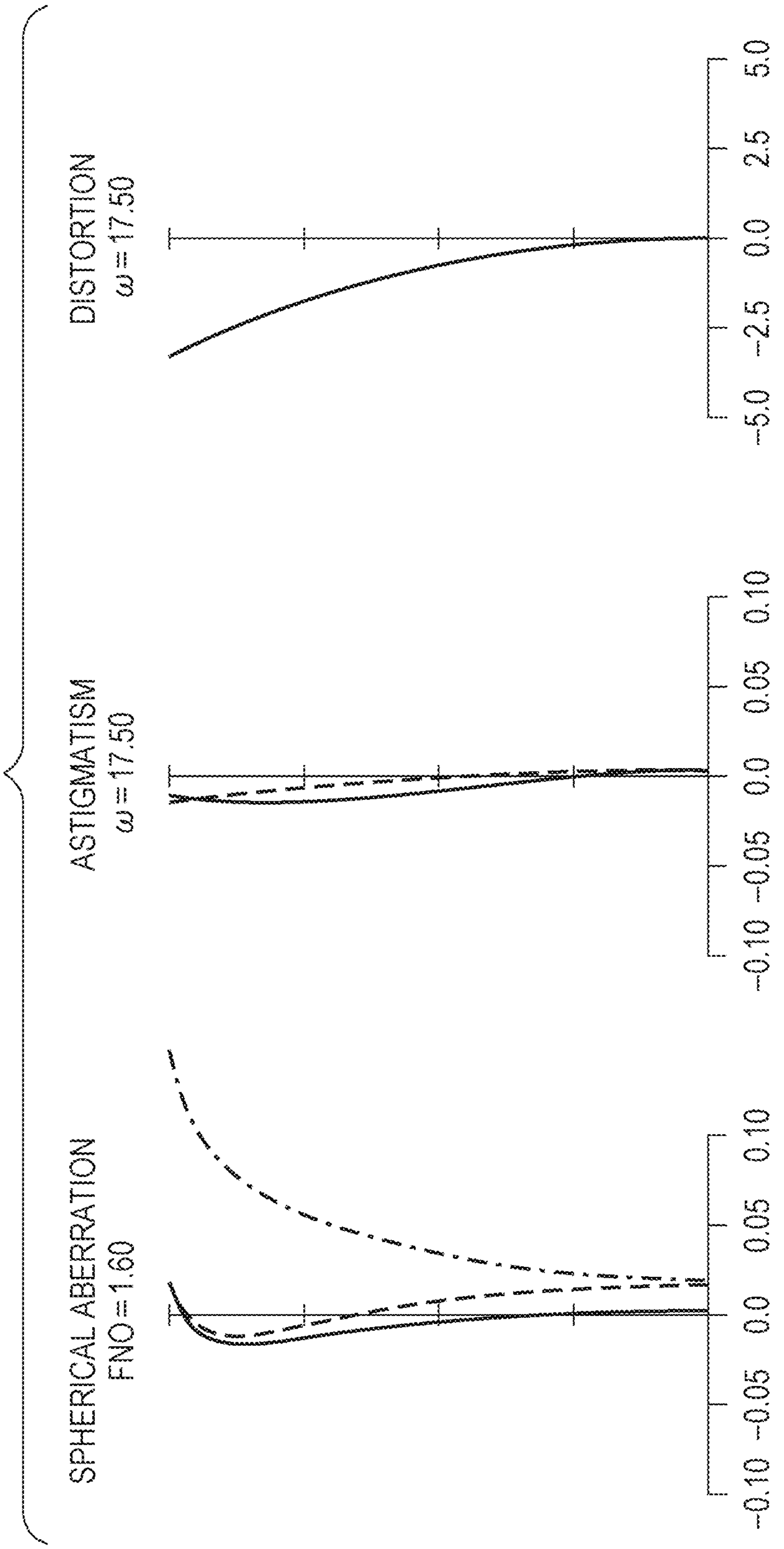
FIG. 10 is a spherical aberration diagram, an astigmatism diagram, and a distortion diagram of the optical system according to Example 5 of the present invention.

FIG. 9 is a lens cross-sectional view illustrating a configuration of an optical system of Example 5 according to the present invention. The optical system includes, in order from the object side, a front group GF having negative refractive power, a diaphragm, and a rear group GR having positive refractive power.

The front group GF having negative refractive power includes, in order from the object side, a positive meniscus lens L1 having a convex shape in the object side, a positive meniscus lens L2 having a convex shape in the object side, and a biconcave lens L3 having negative refractive power and in which both the object-side surface and the image-side surface are concave surfaces. Here, the positive meniscus lens L1 having a convex shape in the object side corresponds to the lens A of the present invention.

The rear group GR having positive refractive power includes, in order from the object side, a biconvex lens L4 having positive refractive power and having a convex surface on both the object-side surface and the image-side surface, a cemented lens including a biconvex lens L5 having positive refractive power and having a convex surface on both the object-side surface and the image-side surface, and a negative meniscus lens L6 having a concave shape in the object side, and a negative meniscus lens L7 having a concave shape in the object side. Here, the negative meniscus lens L7 having a concave shape in the object side corresponds to the lens B of the present invention.

Longitudinal aberration diagrams of the optical system during infinity focus are illustrated. The longitudinal aberration diagrams include spherical aberration (mm), astigmatism (mm), and distortion (%) in order from the left side of the diagrams. In the diagrams representing the spherical aberration, the vertical axis represents the open F number (Fno). The solid line indicates spherical aberration at the d-line (wavelength: 587.56 nm), the dotted line indicates spherical aberration at the C-line (wavelength: 656.27 nm), and the alternate long and dash-dot line indicates spherical aberration at the g-line (wavelength: 435.84 nm). In the diagrams representing astigmatism, the vertical axis represents the image height (mm). The solid line indicates a sagittal direction at the d line (wavelength: 587.56 nm), and a dotted line indicates a meridional direction at the d line. In the diagrams illustrating the distortion, the vertical axis represents the image height (mm), and the distortion (%) at the d-line (wavelength 587.56 nm) is illustrated.

Numerical Examples 1 to 5 respectively corresponding to Examples 1 to 5 will be described below. In the surface data of each Numerical Example, “surface number” represents the number of the lens surface counted from the object side, “r” represents the radius of curvature (mm) (where a surface having a value of r of 0.0000 indicates that the surface is a flat surface) of the lens surface, “d” represents the interval (mm) on the optical axis of the lens surface between the i-th (i is a natural number) lens surface and the (i+1)-th lens surface from the object side, “Nd” represents the refractive index with respect to the d line (wavelength λ=587.56 nm), “νd” represents the Abbe number with respect to the d line, and “h” represents the effective radius (mm).

Note that, in each Numerical Example, a focal length (mm), an F number (F value), a half angle of view (°) an image height (mm), a total lens length (mm), and a back focus (BF (in air)) (mm) of the imaging lens are illustrated.

Here, the entire lens length is a distance on the optical axis from the object-side surface of the first lens to the image plane. In addition, the back focus is a value obtained by air-converting the distance on the optical axis from the image-side surface of the n-th lens arranged closest to the image side to the image plane.

In a case where the optical surface is an aspherical surface, a symbol * is attached to the right side of the surface number. Regarding the aspherical shape, the aspherical coefficient can be expressed by the following aspherical expression with the displacement amount Z in the optical axis direction at the position of the height h from the optical axis as a surface vertex reference:

$$Z = ch^2/\left[1 + \left\{1 - (1 + k)c^2h^2\right\}^{1/2}\right] + A4h^4 + A6h^6 + A8h^8 + A10h^{10} + \ldots$$

where c is a curvature (1/r), h is a height from the optical axis, k is a conic coefficient (conic constant), and A4, A6, A8, A10, . . . are aspheric coefficients of each degree. In addition, the notation “E±m” (m represents an integer.) in the numerical values of the aspherical coefficient and the conic constant means “×10±m”.

The aperture diaphragm is denoted by a reference sign S on the right side of the surface number.

The interval that changes during focusing is denoted by a reference sign d on the left side of the interval number. The interval data indicates a variable interval of the optical system.

The lens focal length indicates the focal length of each lens constituting the optical system.

In addition, the lens group focal length indicates the focal length of each lens group constituting the optical system.

Numerical Example 1

Surface data

| Surface number | r | d | Nd | νd | h |
|---|---|---|---|---|---|
| 1 | 11.8115 | 1.163 | 1.76250 | 51.90 | 4.750 |
| 2 | 34.7231 | 0.100 | | | 4.652 |
| 3 | 9.3481 | 1.410 | 1.49700 | 81.61 | 4.420 |
| 4 | 22.7879 | 0.170 | | | 4.183 |
| 5 | 6.7710 | 1.688 | 1.49700 | 81.61 | 3.789 |
| 6 | 18.0838 | 0.657 | | | 3.384 |
| 7 | 34.5707 | 0.490 | 1.90366 | 31.31 | 3.074 |
| 8 | 4.5480 | 1.666 | | | 2.650 |
| 9S | 0.0000 | 4.115 | | | 2.600 |
| 10 | 14.2002 | 2.240 | 1.75666 | 43.30 | 3.200 |
| 11 | −9.6258 | 2.195 | | | 3.353 |
| 12 | −7.7717 | 0.520 | 1.80610 | 33.27 | 3.210 |
| 13 | −63.4644 | 2.641 | | | 3.391 |
| 14 | 0.0000 | 1.000 | 1.51680 | 64.20 | 4.081 |
| 15 | 0.0000 | 1.006 | | | 4.244 |

| | |
|---|---|
| Focal length | 18.441 |
| F-number | 1.976 |
| Half angle of view | 13.604 |
| Image height | 4.500 |
| Total length | 21.055 |
| BF | 4.300 |

Lens focal length

| Lens | Surface number | Focal length |
|---|---|---|
| L1 | 1-2 | 22.972 |
| L2 | 3-4 | 30.819 |

-continued

| | | |
|---|---|---|
| L3 | 5-6 | 20.750 |
| L4 | 7-8 | −5.841 |
| L5 | 10-11 | 7.902 |
| L6 | 11-12 | −11.032 |

| Lens group focal length | | |
|---|---|---|
| Group | Surface number | Focal length |
| GF | 1-8 | 52.719 |
| GR | 10-13 | 14.974 |

Numerical Example 2

| Surface data | | | | | |
|---|---|---|---|---|---|
| Surface number | r | d | Nd | vd | h |
| 1 | 67.9170 | 8.400 | 1.90109 | 42.85 | 26.500 |
| 2 | 605.0464 | 0.626 | | | 25.719 |
| 3 | 57.7434 | 5.238 | 1.75002 | 58.39 | 23.682 |
| 4 | 123.4468 | 6.739 | | | 22.741 |
| 5 | −911.5790 | 1.800 | 1.84666 | 23.78 | 20.068 |
| 6 | 41.5245 | 9.001 | | | 18.368 |
| 7S | 0.0000 | 2.508 | | | 18.000 |
| 8 | 57.6803 | 5.163 | 1.80420 | 46.50 | 18.432 |
| 9 | 8704.3538 | d9 | | | 18.296 |
| 10 | −941.887 | 1.297 | 1.48749 | 70.44 | 16.500 |
| 11* | 35.8899 | d11 | | | 16.500 |
| 12 | 0.0000 | 4.570 | | | 17.000 |
| 13 | 66.3026 | 14.412 | 1.99680 | 42.77 | 21.030 |
| 14 | −40.6808 | 1.700 | 1.59270 | 35.45 | 21.234 |
| 15 | −97.2186 | 4.313 | | | 20.645 |
| 16* | −42.8945 | 1.850 | 1.84666 | 23.78 | 20.500 |
| 17 | −197.4151 | 18.619 | | | 20.553 |
| 18 | 0.0000 | 2.500 | 1.51633 | 64.15 | 21.582 |
| 19 | 0.0000 | d19 | | | 21.668 |

| Aspherical data | | |
|---|---|---|
| Surface number | 11 | 16 |
| k | 0.00000E+00 | 0.00000E+00 |
| A4 | 3.24697E−07 | −5.10314E−07 |
| A6 | −3.57689E−09 | 6.84468E−09 |
| A8 | 1.79819E−11 | −1.48313E−11 |
| A10 | −2.44845E−14 | 1.23711E−14 |

| | |
|---|---|
| Focal length | 75.907 |
| F-number | 1.476 |
| Half angle of view | 16.098 |
| Image height | 21.630 |
| Total length | 113.557 |
| BF | 21.268 |

| Variable interval data | | | |
|---|---|---|---|
| d0 | INF | 2400.433 | 636.565 |
| d9 | 3.684 | 6.673 | 15.990 |
| d11 | 20.137 | 17.148 | 7.833 |
| d19 | 1.025 | 1.034 | 1.163 |

| Lens focal length | | |
|---|---|---|
| Lens | Surface number | Focal length |
| L1 | 1-2 | 84.278 |
| L2 | 3-4 | 139.872 |
| L3 | 5-6 | −46.868 |
| L4 | 8-9 | 72.183 |
| L5 | 10-11 | −70.889 |

-continued

| | | |
|---|---|---|
| L6 | 13-14 | 27.116 |
| L7 | 14-15 | −119.358 |
| L8 | 16-17 | −65.084 |

| Lens group focal length | | |
|---|---|---|
| Group | Surface number | Focal length |
| GF | 1-6 | 291.249 |
| GR | 8-17 | 60.239 |

Numerical Example 3

| Surface data | | | | | |
|---|---|---|---|---|---|
| Surface number | r | d | Nd | vd | h |
| 1 | 14.9283 | 2.000 | 1.80420 | 46.50 | 5.327 |
| 2 | 37.4558 | 0.200 | | | 4.873 |
| 3 | 14.8826 | 1.560 | 1.80100 | 49.35 | 4.555 |
| 4 | 25.9267 | 1.600 | | | 4.226 |
| 5 | −74.7966 | 0.600 | 1.66083 | 25.44 | 3.819 |
| 6 | 9.0588 | 1.090 | | | 3.588 |
| 7S | 0.0000 | 4.823 | | | 3.600 |
| 8 | 11.8228 | 3.698 | 1.84796 | 42.67 | 5.155 |
| 9 | −95.0613 | 3.030 | | | 5.109 |
| 10 | 18.2705 | 3.990 | 1.74443 | 49.26 | 4.798 |
| 11 | −6.8304 | 1.000 | 1.85451 | 25.15 | 4.535 |
| 12 | −40.6708 | 1.541 | | | 4.308 |
| 13 | −8.5200 | 0.600 | 1.71048 | 32.52 | 4.115 |
| 14 | 1001.8088 | 0.380 | | | 4.258 |
| 15 | 0.0000 | 0.500 | 1.56883 | 56.04 | 4.314 |
| 16 | 0.0000 | 1.000 | | | 4.361 |
| 17 | 0.0000 | 0.500 | 1.56883 | 56.04 | 4.512 |
| 18 | 0.0000 | 0.112 | | | 4.559 |

| | |
|---|---|
| Focallength | 15.393 |
| F-number | 1.624 |
| Halfangleofview | 17.000 |
| Imageheight | 4.702 |
| Totallength | 27.856 |
| BF | 2.125 |

| Lens focal length | | |
|---|---|---|
| Lens | Surface number | Focal length |
| L1 | 1-2 | 29.442 |
| L2 | 3-4 | 40.714 |
| L3 | 5-6 | −12.012 |
| L4 | 8-9 | 12.490 |
| L5 | 10-11 | 7.112 |
| L6 | 11-12 | −9.595 |
| L7 | 13-14 | −11.750 |

| Lens group focal length | | |
|---|---|---|
| Group | Surface number | Focal length |
| GF | 1-6 | −218.480 |
| GR | 8-14 | 10.836 |

Numerical Example 4

| Surface data | | | | | |
|---|---|---|---|---|---|
| Surface number | r | d | Nd | vd | h |
| 1 | 42.0621 | 1.533 | 1.80420 | 46.50 | 5.296 |
| 2 | −1655.6058 | 0.220 | | | 5.024 |
| 3 | 11.1051 | 1.897 | 1.77250 | 49.62 | 4.500 |
| 4 | 33.3982 | 2.069 | | | 4.201 |
| 5 | −88.8186 | 0.600 | 1.69895 | 30.05 | 3.627 |
| 6 | 8.6361 | 1.108 | | | 3.393 |
| 7S | 0.0000 | 5.017 | | | 3.394 |
| 8 | 11.5135 | 3.987 | 1.61800 | 63.39 | 4.450 |
| 9 | −32.7094 | 0.220 | | | 4.671 |
| 10 | 23.7072 | 5.000 | 1.88100 | 40.14 | 4.714 |
| 11 | −10.3589 | 1.794 | 1.75211 | 25.05 | 4.457 |
| 12 | −840.8044 | 1.583 | | | 4.133 |
| 13 | −7.4582 | 0.600 | 1.59270 | 35.45 | 4.050 |
| 14 | −152.2476 | 0.300 | | | 4.253 |
| 15 | 0.0000 | 0.500 | 1.51680 | 64.20 | 4.314 |
| 16 | 0.0000 | 1.000 | | | 4.370 |
| 17 | 0.0000 | 0.500 | 1.51680 | 64.20 | 4.541 |
| 18 | 0.0000 | 0.607 | | | 4.596 |

| | |
|---|---|
| Focal length | 15.372 |
| F-number | 1.648 |
| Half angle of view | 17.500 |
| Image height | 4.847 |
| Total length | 28.534 |
| BF | 2.566 |

| Lens focal length | | |
|---|---|---|
| Lens | Surface number | Focal length |
| L1 | 1-2 | 50.613 |
| L2 | 3-4 | 20.605 |
| L3 | 5-6 | −11.092 |
| L4 | 8-9 | 14.188 |
| L5 | 10-11 | 8.707 |
| L6 | 11-12 | −13.749 |
| L7 | 13-14 | −13.111 |

| Lens group focal length | | |
|---|---|---|
| Group | Surface number | Focal length |
| GF | 1-6 | 388.055 |
| GR | 8-14 | 11.464 |

Numerical Example 5

| Surface data | | | | | |
|---|---|---|---|---|---|
| Surface number | r | d | Nd | vd | h |
| 1 | 24.1852 | 1.602 | 1.81080 | 46.50 | 5.434 |
| 2 | 65.0858 | 0.200 | | | 5.106 |
| 3 | 11.3761 | 1.560 | 1.89126 | 40.80 | 4.650 |
| 4 | 13.9166 | 1.420 | | | 4.287 |
| 5 | −17.5996 | 0.600 | 1.73902 | 32.23 | 4.226 |
| 6 | 10.4013 | 1.474 | | | 4.202 |
| 7S | 0.0000 | 1.566 | | | 4.415 |
| 8 | 15.1455 | 3.464 | 1.89126 | 40.80 | 5.400 |
| 9 | −26.1438 | 0.885 | | | 5.573 |
| 10 | 17.0821 | 4.450 | 1.62172 | 63.39 | 5.529 |
| 11 | −7.4849 | 2.500 | 1.86746 | 25.15 | 5.348 |
| 12 | −14.3048 | 3.833 | | | 5.429 |
| 13 | −7.0976 | 0.797 | 1.69804 | 31.14 | 4.143 |
| 14 | −25.4844 | 0.500 | | | 4.349 |
| 15 | 0.0000 | 0.500 | 1.51680 | 64.20 | 4.417 |

-continued

| | | | | | |
|---|---|---|---|---|---|
| 16 | 0.0000 | 2.572 | | | 4.442 |
| 17 | 0.0000 | 0.500 | 1.51680 | 64.20 | 4.642 |
| 18 | 0.0000 | 1.077 | | | 4.667 |

| | |
|---|---|
| Focal length | 15.400 |
| F-number | 1.600 |
| Half angle of view | 17.500 |
| Image height | 4.856 |
| Total length | 29.499 |
| BF | 4.785 |

| Lens focal length | | |
|---|---|---|
| Lens | Surface number | Focal length |
| L1 | 1-2 | 46.649 |
| L2 | 3-4 | 54.231 |
| L3 | 5-6 | −8.767 |
| L4 | 8-9 | 11.203 |
| L5 | 10-11 | 8.996 |
| L6 | 11-12 | −21.812 |
| L7 | 13-14 | −14.349 |

| Lens group focal length | | |
|---|---|---|
| Group | Surface number | Focal length |
| GF | 1-6 | −18.815 |
| GR | 8-14 | 7.619 |

Corresponding values and various numerical values of the Conditional Expressions (1) to (19) in Examples 1 to 5 are described in the following Table 1.

TABLE 1

| | |
|---|---|
| (1) | NdLB |
| (2) | TLSB/BF |
| (3) | fR/f |
| (4) | FLB/f |
| (5) | vdLA |
| (6) | vdLB |
| (7) | CRBf/f |
| (8) | f/EPD |
| (9) | FLA/f |
| (10) | (CRBf + CRBr)/(CRBf − CRBr) |
| (11) | NdLA |
| (12) | BF/f |
| (13) | CRsz/f |
| (14) | \|ff\|/fR |
| (15) | FLB/FLA |
| (16) | TLAS/TLSB |
| (17) | CRBf/BF |
| (18) | vdLA/vdLB |
| (19) | TTL/f |

| | Example 1 | Example 2 | Example 3 | Example 4 | Example 5 |
|---|---|---|---|---|---|
| (1) | 1.806 | 1.847 | 1.719 | 1.599 | 1.698 |
| (2) | 2.109 | 2.804 | 8.792 | 7.092 | 3.656 |
| (3) | 0.812 | 0.794 | 0.705 | 0.746 | 0.495 |
| (4) | −0.598 | −0.857 | −0.764 | −0.854 | −0.932 |
| (5) | 51.903 | 42.849 | 46.502 | 46.502 | 46.502 |
| (6) | 33.269 | 23.784 | 32.520 | 35.445 | 31.138 |
| (7) | −0.421 | −0.565 | −0.554 | −0.486 | −0.461 |
| (8) | 1.976 | 1.476 | 1.621 | 1.600 | 1.600 |
| (9) | 1.246 | 1.110 | 1.914 | 3.295 | 3.029 |
| (10) | −1.279 | −1.555 | −0.983 | −1.103 | −1.772 |
| (11) | 1.763 | 1.901 | 1.811 | 1.811 | 1.811 |
| (12) | 0.232 | 0.280 | 0.138 | 0.167 | 0.311 |
| (13) | 0.770 | 0.760 | 0.769 | 0.750 | 0.983 |
| (14) | 3.521 | 4.835 | 20.163 | 33.851 | 2.470 |
| (15) | −0.480 | −0.772 | −0.399 | −0.259 | −0.308 |
| (16) | 0.810 | 0.533 | 0.377 | 0.408 | 0.392 |
| (17) | −1.807 | −2.017 | −4.010 | −2.906 | −1.483 |
| (18) | 1.560 | 1.802 | 1.430 | 1.312 | 1.493 |
| (19) | 1.142 | 1.496 | 1.834 | 1.857 | 1.915 |
| TLSB | 9.070 | 59.634 | 18.681 | 18.201 | 17.494 |

TABLE 1-continued

| | | | | | |
|---|---|---|---|---|---|
| BF | 4.300 | 21.268 | 2.125 | 2.566 | 4.785 |
| fR | 14.974 | 60.239 | 10.836 | 11.464 | 7.619 |
| f | 18.441 | 75.907 | 15.380 | 15.361 | 15.400 |
| FLB | −11.032 | −65.084 | −11.750 | −13.111 | −14.348 |
| CRBf | −7.772 | −42.895 | −8.520 | −7.458 | −7.098 |
| EPD | 9.334 | 51.432 | 9.491 | 9.600 | 9.625 |
| FLA | 22.972 | 84.278 | 29.442 | 50.613 | 46.649 |
| CRBr | −63.464 | −197.415 | 1001.809 | −152.248 | −25.484 |
| CRsz | 14.200 | 57.680 | 11.823 | 11.513 | 15.146 |
| ff | 52.719 | 291.249 | −218.480 | 388.055 | −18.815 |
| TLAS | 7.344 | 31.804 | 7.050 | 7.427 | 6.856 |
| TTL | 21.055 | 113.557 | 28.211 | 28.527 | 29.499 |

Although the preferable embodiments of the present invention have been described above, the present invention is not limited to these embodiments, and various modifications and changes can be made within the scope of the gist of the present invention.

In addition, as another invention to which the present invention is applied, the following is conceivable.

In order to solve the above problem, an optical system according to the present invention includes a front group, a diaphragm, and a rear group in order from an object side, in which the optical system includes a lens A having positive refractive power and being closest to the object side in the front group and a lens B having negative refractive power and being closest to an image side in the rear group, an object-side surface of the lens B has a concave surface with respect to the object side, and the optical system satisfies following conditional expressions:

$$1.59 < NdLB < 2.30 \tag{1}$$

$$0.10 < BF/f < 0.55 \tag{12}$$

where

NdLB is a refractive index at a d-line of the lens B,

BF is an air conversion distance from a lens surface closest to the image side in the rear group to the image plane, f is a focal length of the optical system.

In addition, as another invention to which the present invention is applied, the following is conceivable.

In order to solve the above problem, an optical system according to the present invention includes a front group, a diaphragm, and a rear group in order from an object side, in which the optical system includes a lens A having positive refractive power and being closest to the object side in the front group and a lens B having negative refractive power and being closest to an image side in the rear group, an object-side surface of the lens B has a concave surface with respect to the object side, and the optical system satisfies following conditional expressions:

$$1.59 < NdLB < 2.30 \tag{1}$$

$$1.00 < TTL/f < 3.50 \tag{19}$$

where

NdLB is a refractive index at a d-line of the lens B,

TTL is the distance from the lens surface closest to the object side of the front group to the image plane, and f is a focal length of the optical system.

INDUSTRIAL APPLICABILITY

According to the present invention, a small and high-performance optical system, an imaging device, and a moving body can be provided.

What is claimed is:

1. An optical system comprising a front group, a diaphragm, and a rear group in order from an object side, wherein the optical system includes a lens A having positive refractive power and being closest to the object side in the front group and a lens B having negative refractive power and being closest to an image side in the rear group, an object-side surface of the lens B has a concave surface with respect to the object side, a number of lenses having refractive power and included in the front group and the rear group is eight or less in total, and the optical system satisfies following conditions:

$$1.59 < NdLB < 2.30 \tag{1}$$

$$1.60 < TLSB/BF < 10.00 \tag{2}$$

$$0.20 < fR/f < 1.05 \tag{3}$$

where

NdLB is a refractive index at a d-line of the lens B,

TLSB is a distance from the diaphragm to an image-side surface of the lens B,

BF is an air conversion distance from a lens surface closest to the image side in the rear group to the image plane, fR is a focal length of the rear group, and f is a focal length of the optical system.

2. The optical system according to claim 1, wherein the optical system satisfies a following condition:

$$-1.85 < FLB/f < -0.45 \tag{4}$$

where

FLB is a focal length of the lens B.

3. The optical system according to claim 1, wherein the optical system satisfies a following condition:

$$25.00 < \nu dLA < 110.00 \tag{5}$$

where

νdLA is an Abbe number at a d-line of the lens A.

4. The optical system according to claim 1, wherein the optical system satisfies a following condition:

$$18.00 < \nu dLB < 52.00 \tag{6}$$

where

νdLB is an Abbe number at a d-line of the lens B.

5. The optical system according to claim 1, wherein the optical system satisfies a following condition:

$$-1.18 < CRBf/f < -0.20 \quad (7)$$

where

CRBf is a radius of curvature of the object-side surface of the lens B.

6. The optical system according to claim 1, wherein the optical system satisfies a following condition:

$$f/EPD < 2.60 \quad (8)$$

where

EPD is an entrance pupil diameter of the optical system.

7. The optical system according to claim 1, wherein the optical system satisfies a following condition:

$$0.65 < FLA/f < 3.80 \quad (9)$$

where

FLA is a focal length of the lens A.

8. The optical system according to claim 1, wherein the optical system satisfies a following condition:

$$-3.20 < (CRBf + CRBr)/(CRBF - CRBr) < -0.53 \quad (10)$$

where

CRBf is a radius of curvature of the object-side surface of the lens B, and

CRBr is a radius of curvature of the image-side surface of the lens B.

9. The optical system according to claim 1, wherein the optical system satisfies a following condition:

$$1.42 < NdLA < 2.30 \quad (11)$$

where

NdLA is a refractive index at the d-line of the lens A.

10. The optical system according to claim 1, wherein the optical system satisfies a following condition:

$$0.10 < BF/f < 0.55 \quad (12)$$

where

BF is the air conversion distance from the lens surface closest to the image side in the rear group to the image plane.

11. The optical system according to claim 1, wherein the optical system satisfies a following condition:

$$0.20 < CRsz/f < 25.00 \quad (13)$$

where

CRsz is a radius of curvature of an image-side surface of the diaphragm.

12. The optical system according to claim 1, wherein the optical system satisfies a following condition:

$$1.90 < |ff|/fR < 1000.00 \quad (14)$$

where ff is a focal length of the front group, and fR is the focal length of the rear group.

13. The optical system according to claim 1, wherein the optical system satisfies a following condition:

$$-0.89 < FLB/FLA < -0.20 \quad (15)$$

where

FLA is a focal length of the lens A, and

FLB is a focal length of the lens B.

14. The optical system according to claim 1, wherein the optical system satisfies a following condition:

$$0.30 < TLAS/TLSB < 0.92 \quad (16)$$

where

TLAS is a distance from the object-side surface of the lens A to the diaphragm, and TLSB is the distance from the diaphragm to the image-side surface of the lens B.

15. The optical system according to claim 1, wherein the optical system satisfies a following condition:

$$-4.50 < CRBf/BF < -1.20 \quad (17)$$

where

CRBf is a radius of curvature of the object-side surface of the lens B, and

BF is the air conversion distance from the lens surface closest to the image side in the rear group to the image plane.

16. The optical system according to claim 1, wherein the optical system satisfies a following condition:

$$0.30 < \nu dLA/\nu dLB < 3.00 \quad (18)$$

where

νdLA is an Abbe number at a d-line of the lens A, and

νdLB is an Abbe number at a d-line of the lens B.

17. The optical system according to claim 1, wherein the optical system satisfies a following condition:

$$1.00 < TTL/f < 3.50 \quad (19)$$

where

TTL is a distance from a lens surface closest to the object side in the front group to an image plane.

18. An imaging device comprising an image sensor that converts an optical image formed by the optical system according to claim 1 into an electrical signal on an image side of the optical system.

19. A moving body comprising the imaging device according to claim 18.

20. An optical system comprising a front group, a diaphragm, and a rear group in order from an object side, wherein the optical system includes a lens A having positive refractive power and being closest to the object side in the front group and a lens B having negative refractive power and being closest to an image side in the rear group, an object-side surface of the lens B has a concave surface with respect to the object side, a number of lenses having refractive power included in the rear group is five or less in total, and the optical system satisfies following conditions:

$$0.20 < fR/f < 0.92 \tag{3-1}$$

$$-1.85 < FLB/f < -0.45 \tag{4}$$

$$25.00 < \nu dLA < 110.00 \tag{5}$$

$$18.00 < \nu dLB < 52.00 \tag{6}$$

$$-1.18 < CRBf/f < -0.20 \tag{7}$$

where fR is a focal length of the rear group, f is a focal length of the optical system, FLB is a focal length of the lens B, νdLA is an Abbe number at a d-line of the lens A, νdLB is an Abbe number at a d-line of the lens B, and CRBf is a radius of curvature of the object-side surface of the lens B.

21. The optical system according to claim 20, wherein the optical system satisfies a following condition:

$$1.59 < NdLB < 2.30 \tag{1}$$

where

NdLB is a refractive index at the d-line of the lens B.

22. The optical system according to claim 20, wherein the optical system satisfies a following condition:

$$1.60 < TLSB/BF < 10.00 \tag{2}$$

where

TLSB is a distance from the diaphragm to an image-side surface of the lens B, and BF is an air conversion distance from a lens surface closest to the image side in the rear group to the image plane.

* * * * *